United States Patent [19]
Miyazaki et al.

[11] Patent Number: 6,010,760
[45] Date of Patent: Jan. 4, 2000

[54] THERMOPLASTIC RESIN COMPOSITION, INJECTION MOLDING METHOD THEREOF, AND INJECTION MOLDED ARTICLE

[75] Inventors: Hirotaka Miyazaki; Tomoyuki Aketa; Haruji Murakami; Takayuki Ishikawa; Kazuhito Kobayashi; Ayako Migita, all of Shizuoka, Japan

[73] Assignee: Polyplastics Co., Ltd., Osaka, Japan

[21] Appl. No.: 08/817,346

[22] PCT Filed: Oct. 18, 1995

[86] PCT No.: PCT/JP95/02133

§ 371 Date: Jun. 17, 1997

§ 102(e) Date: Jun. 17, 1997

[87] PCT Pub. No.: WO96/11985

PCT Pub. Date: Apr. 25, 1996

[30] Foreign Application Priority Data

Oct. 18, 1994 [JP] Japan .................................... 6-277177
Oct. 18, 1994 [JP] Japan .................................... 6-277178
Apr. 25, 1995 [JP] Japan .................................... 7-124359
Sep. 25, 1995 [JP] Japan .................................... 7-270608

[51] Int. Cl.$^7$ ............................. C08K 5/49; B29B 45/00
[52] U.S. Cl. ..................................... 428/36.92; 264/328.1; 264/328.14; 428/35.7; 428/297.4; 428/339; 524/128; 524/150; 524/151; 524/153; 525/67; 525/132; 525/400; 525/425; 525/437; 525/444; 525/450
[58] Field of Search ................................ 428/35.7, 36.92, 428/339, 297.4; 264/328.1, 328.14; 525/67, 132, 400, 425, 437, 439, 444, 450; 524/128, 150, 151, 153

[56] References Cited

U.S. PATENT DOCUMENTS 4,439,578  3/1984  Kim ........................................ 524/538
5,043,400  8/1991  Tsurata ................................... 525/437
5,420,184  5/1995  Tsukahava ............................. 524/120

FOREIGN PATENT DOCUMENTS 04164615  6/1992  Japan .
06031776  2/1994  Japan .

Primary Examiner—Patricia A. Short
Attorney, Agent, or Firm—Burns, Doane, Swecker & Mathis, LLP

[57] ABSTRACT

A thermoplastic resin composition comprising a thermoplastic resin (A) not forming an anisotropic melt phase and a liquid crystal polymer (B) capable of forming an anisotropic melt phase, an injection molding method thereof and an injection molded article capable of providing a thin molded article having excellent mechanical strength. A thermoplastic resin composition (C) comprises 99 to 50 wt. % of the thermoplastic resin (A) and 1 to 50 wt. % of the liquid crystal polymer (B). The liquid crystal polymer (B) is microscopically dispersed in an island form in the matrix phase of the thermoplastic resin (A) so that when the composition (C) is heat-treated at a temperature not lower than the melting point of the liquid crystal polymer (B) under a non-load state and is then cooled, the liquid crystal polymer (B) has a weight average particle diameter within the range of 10 to 40 micrometers and at least 80 wt. % thereof has a particle diameter within the range of 0.5 to 60 micrometers. The injection molding method comprises carrying out injection molding of the thermoplastic resin composition (C) at a processing temperature greater than or equal to the flow beginning temperature of the liquid crystal polymer (B) and at a gate passage rate of the molten resin of at least 500 m/min, and an injection molded article characterized in that the liquid crystal polymer (B) is dispersed in a fibrous form in the matrix phase of the thermoplastic resin (A) at a mean aspect ratio of at least 6.

29 Claims, 2 Drawing Sheets

SIDE GATE, FILM GATE

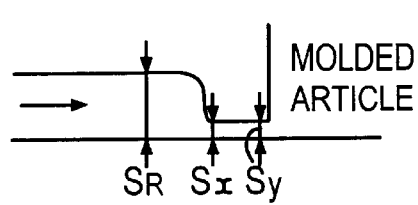

If $S_x > S_y$, then $S_G = S_y$
If $S_x < S_y$, then $S_G = S_x$
If $S_x = S_y$, then $S_G = S_x = S_y$

FIG. 1A

OVERLAP GATE

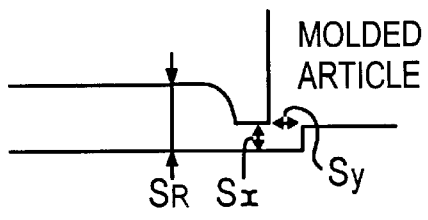

If $S_x > S_y$, then $S_G = S_y$
If $S_x < S_y$, then $S_G = S_x$
If $S_x = S_y$, then $S_G = S_x = S_y$

FIG. 1B

PIN GATE

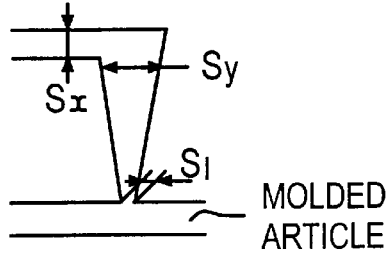

If $S_x > S_y$, then $S_R = S_y$
If $S_x < S_y$, then $S_R = S_x$
If $S_x = S_y$, then $S_R = S_x = S_y$

FIG. 1C

DIRECT GATE

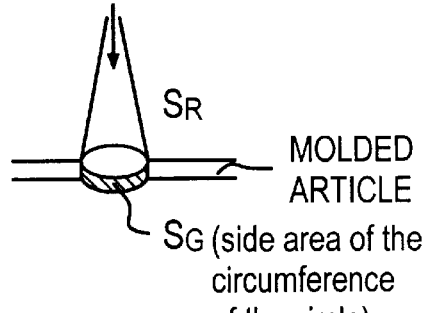

$S_G$ (side area of the circumference of the circle)

FIG. 1D

DISK GATE

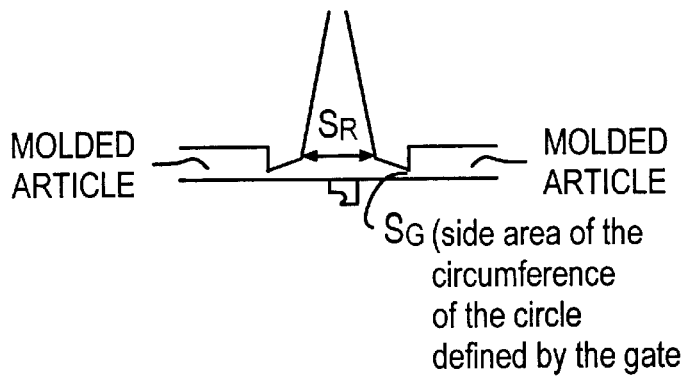

$S_G$ (side area of the circumference of the circle defined by the gate)

FIG. 1E

FILM GATE

THERMOPLASTIC RESIN COMPOSITION, INJECTION MOLDING METHOD THEREOF, AND INJECTION MOLDED ARTICLE

TECHNICAL FIELD

The present invention relates to a thermoplastic resin composition comprising a thermoplastic resin not forming an anisotropic melt phase and a liquid crystal polymer capable of forming an anisotropic melt phase, an injection molding method thereof, and injection molded articles.

BACKGROUND OF THE INVENTION

Liquid crystal polymers capable of forming an anisotropic melt phase have a number of notable characteristics including high strength, high rigidity, high resistance to heat, and good moldability. However, they exhibit different molding shrinkages and mechanical properties in the molecular chain orientation direction as compared to in the direction perpendicular. Their high prices are also disadvantageous in terms of the commercial aspect.

On the other hand, thermoplastic resins not forming an anisotropic melt phase are relatively inexpensive, but are inferior to liquid crystalline polyester in terms of resistance to heat, rigidity, and like properties. Particularly when thermoplastic resins are attempted to be used for forming a thin-wall housing, their shortage of melt resin fluidity and rigidity during manufacture of the housing limits the design to only thick walls. Therefore, the recent trend of reducing size and weight in the fields of electrical devices, electronics, and telecommunications has faced a limitation.

Accordingly, it has been attempted to use a liquid crystal polymer and a thermoplastic resin in combination so as to compensate their respective drawbacks while making best use of their advantages. However, when an injection-molded article is formed of a thermoplastic resin composition prepared by simply blending the two components, characteristic features of liquid crystal polymers such as high strength, high rigidity, high resistance to heat, and good moldability (i.e., high fluidity) are not ensured, and the mechanical strength of the article is significantly degraded. This is because a molded article of a thermoplastic resin composition resulting from a simple blending of a thermoplastic resin and a liquid crystal polymer has a structure in which almost all the liquid crystal polymer in the form of spheres except in a surface phase is merely dispersed in a thermoplastic resin matrix, and therefore, no reinforcing effect can be expected; high mechanical strength and other notable properties of liquid crystal polymers are derived from their molecular orientation when the molecules undergo shear stress and elongation stress during processing in the molten state.

When the proportion of a liquid crystal polymer is increased while that of a thermoplastic resin is decreased, the liquid crystal polymer comes to be in the form of a matrix, with the thermoplastic resin dispersed therein as islands, and this composition cannot make best use of the advantages of the thermoplastic resin, and therefore, has insignificant value in use.

Under the above circumstances, the methods as described in Japanese Patent Application Laid-Open (kokai) No. 5-70700 and No. 5-112709 were proposed. According to the methods, a mixture of liquid crystal polymer and a thermoplastic resin is extruded while the mixture is stretched at a temperature at which both are molten, to thereby prepare a material to be molded such that the liquid crystal polymer is present in advance as fibers having a large aspect ratio (length/thickness), and when a molded article is formed, the material is molded at a temperature at which the liquid crystal polymer is not molten but the thermoplastic resin is molten, to thereby obtain a molded article containing fibrous liquid crystal polymer having reinforcing effect.

In these methods, through preliminary extrusion while stretching and through elongation of the melt-extruded product by use of rollers or similar means, the liquid crystal polymer is caused to align in the composition as fibers, and subsequently, when a molded product is formed by injection molding or other process, the composition is molded at a temperature lower than the melting point of the liquid crystal polymer. Alternatively, in the direct formation of a molded product, a considerably great shear force must be applied to the resin composition when the mold is filled with the composition, to thereby orient the liquid crystal polymer. Thus, in the former case, it often occurs that fluidity is lost, molding conditions are limited, and rigidity of the resultant molded article is not satisfactory. In the latter case, the shape of the molded article is restricted, and in addition, strength may be insufficient due to lack of full orientation depending on the position of the molded article.

DISCLOSURE OF THE INVENTION

In view of the foregoing, the present inventors conducted earnest research and studies in search of a material exhibiting excellent characteristics that permit use for forming thin wall articles, and found that it is very important to subject to injection-mold a composition containing a thermoplastic resin and a liquid crystal polymer, the liquid crystal polymer being dispersed in a matrix phase of the thermoplastic resin at a predetermined state. They also found that when conditions for injection molding are specifically preset, the liquid crystal polymer is easily converted to have a fibrous form, to thereby exhibit very high reinforcing effect that has never been obtained heretofore, and thus, the properties of the resultant molded article are remarkable, particularly being capable of yielding a thin-wall molded article having excellent mechanical strength. The present invention was accomplished based on these findings.

According to a first aspect of the present invention, there is provided a thermoplastic resin composition characterized by comprising 99 to 50 wt. % of a thermoplastic resin (A) not forming an anisotropic melt phase and 1 to 50 wt. % of a liquid crystal polymer (B) capable of forming an anisotropic melt phase (the total of the two accounting for 100 wt. %) and 0.01 to 0.5 parts by weight of a phosphorus-containing compound with respect to 100 parts by weight in total of the thermoplastic resin (A) and the liquid crystal polymer (B).

The present invention also provides a thermoplastic resin composition as described above, which is used for injection molding.

The present invention also provides an injection molding method characterized in that the aforementioned thermoplastic resin composition is injection-molded at a processing temperature greater than or equal to the flow beginning temperature of the liquid crystal polymer (B) and at a gate passage rate of the molten resin of at least 500 m/min.

According to a second aspect of the present invention, there is provided an injection molding method, characterized in that a thermoplastic resin composition comprising 99 to 50 wt. % of a thermoplastic resin (A) not forming an anisotropic melt phase and 1 to 50 wt. % of a liquid crystal polymer (B) capable of forming an anisotropic melt phase (the total of the two accounting for 100 wt. %) is injection-molded at a processing temperature greater than or equal to the flow beginning temperature of the liquid crystal polymer (B) and at a gate passage rate of the molten resin of at least 500 m/min, said thermoplastic resin composition being characterized in that the liquid crystal polymer (B) is microscopically dispersed in the form of islands in the matrix phase of the thermoplastic resin (A) so that when the thermoplastic resin composition is heat-treated at a temperature not lower than the melting point of the liquid crystal polymer (B) under a non-load state and is then cooled, the liquid crystal polymer (B) has a weight average particle diameter within the range of 10 to 40 micrometers and at least 80 wt. % thereof has a particle diameter within the range of 0.5 to 60 micrometers.

According to a second aspect of the present invention, there is provided an injection molding method, characterized in that the aforementioned thermoplastic resin composition is injection-molded at a processing temperature greater than or equal to the flow beginning temperature of the liquid crystal polymer (B) and at a gate passage rate of the molten resin of at least 500 m/min.

The present invention also provides an injection molding method, characterized in that the thermoplastic resin composition is injection-molded at a processing temperature greater than or equal to the melting point of the liquid crystal polymer (B) and at a gate passage rate of the molten resin of at least 500 m/min.

The present invention also provides an injection molding method, characterized in that the thermoplastic resin composition is injection-molded at a processing temperature greater than or equal to the flow beginning temperature of the liquid crystal polymer (B) and below the melting point thereof and at a gate passage rate of the molten resin of at least 500 m/min.

The present invention also provides an injection molding method, characterized in that the thermoplastic resin composition is injection-molded at a processing temperature greater than or equal to the flow beginning temperature of the liquid crystal polymer (B) and at a gate passage rate of the molten resin of at least 500 m/min, and through use of a mold for injection molding having a ratio $S_R/S_G$ of between 3 and 150, wherein $S_G$ and $S_R$ represent the cross sectional area of a gate of the mold and the cross sectional area of a runner of the mold, respectively.

According to a third aspect of the present invention, there is provided an injection molded article formed of a thermoplastic resin composition comprising 99 to 50 wt. % of a thermoplastic resin (A) not forming an anisotropic melt phase and 1 to 50 wt. % of a liquid crystal polymer (B) capable of forming an anisotropic melt phase (the total of the two accounting for 100 wt. %), characterized in that the liquid crystal polymer (B) is dispersed in a fibrous form in the matrix phase of the thermoplastic resin (A) at a mean aspect ratio of at least 6, and that the liquid crystal polymer (B) is microscopically dispersed in the form of islands in the matrix phase of the thermoplastic resin (A) so that when the injection-molded article is heat-treated at a temperature not lower than the melting point of the liquid crystal polymer (B) under a non-load state and is then cooled, the liquid crystal polymer (B) has a weight average particle diameter within the range of 10 to 40 micrometers and at least 80 wt. % thereof has a particle diameter within the range of 0.5 to 60 micrometers.

The present invention also provides an injection molded article as described above, wherein the viscosity ratio (Aη/Bη) of thermoplastic resin (A) to liquid crystal polymer (B) is at least 0.1 when measured at a processing temperature greater than or equal to the flow beginning temperature of the liquid crystal polymer (B) and at a shear rate of 1,200 sec$^{-1}$.

The present invention also provides an injection molded article as described above, wherein the viscosity ratio (Aη/Bη) is at least 0.1 and less than 6.

The present invention also provides an injection molded article as described above, wherein the thermoplastic resin (A) is polyester resin.

The present invention also provides an injection molded article as described above, wherein the polyester resin is polycarbonate resin.

The present invention also provides an injection molded article as described above, wherein the thermoplastic resin (A) is a mixture of polycarbonate resin and ABS resin.

The present invention also provides an injection molded article as described above, wherein the thermoplastic resin (A) is a mixture of polycarbonate resin, and polyalkylene terephthalate resin and/or amorphous polyarylate resin.

The present invention also provides an injection molded article as described above, wherein the thermoplastic resin (A) is polyarylene sulfide resin.

The present invention also provides an injection molded article as described above, wherein 0.01 to 0.5 parts by weight of a phosphorus-containing compound is contained with respect to 100 parts by weight in total of the thermoplastic resin (A) and the liquid crystal polymer (B).

According to a fourth aspect of the present invention, there is provided an injection molded article formed of a thermoplastic resin composition comprising 99 to 50 wt. % of a thermoplastic resin (A) not forming an anisotropic melt phase and 1 to 50 wt. % of a liquid crystal polymer (B) capable of forming an anisotropic melt phase (the total of the two accounting for 100 wt. %), characterized in that the liquid crystal polymer (B) is dispersed in a fibrous form in the matrix phase of the thermoplastic resin (A) at a mean aspect ratio of at least 6;

that the liquid crystal polymer (B) is microscopically dispersed in the form of islands in the matrix phase of the thermoplastic resin (A) so that when the injection-molded article is molten at a temperature not lower than the melting point of the liquid crystal polymer (B) under a non-load state and is then cooled, the liquid crystal polymer (B) has a weight average particle diameter within the range of 10 to 40 micrometers and at least 80 wt. % thereof has a particle diameter within the range of 0.5 to 60 micrometers;

that the flexural modulus of the injection molded article is at least 40,000 kg/cm$^2$ as measured in accordance with ASTM D790;

and that the melt viscosity of a melt obtained through remelting the injection molded article is within the range from 400 to 2,500 poise when measured at a temperature 20° C. higher than the melting point of the liquid crystal polymer (B) and at a shear rate of 1,200 sec$^{-1}$.

The present invention also provides an injection molded article as described above, wherein the thermoplastic resin (A) is polycarbonate resin.

The present invention also provides an injection molded article as described above, which is a thin wall article in which 50% or more of the walls of the molded article have a thickness of 1 mm or less.

The present invention also provides an injection molded article as described above, which is a housing of an electronic device.

The present invention also provides an injection molded article as described above, wherein the electronic device is a personal computer, a cellular phone, a connector, a CD pickup component, a hard disk, or their peripheral components.

BEST MODE FOR CARRYING OUT THE INVENTION

Examples of the thermoplastic resin (A) which is used in the present invention include, but are not limited to, polyolefin (co)polymers such as polyethylene, polypropylene, and poly 4-methyl-1-pentene; polyester resins including polyalkylene terephthalate (co)polymers such as polyethylene terephthalate and polybutylene terephthalate, polycarbonate (co)polymers, and amorphous polyarylate resin; polyamide (co)polymers; ABS resin, polyarylene sulfide (co)polymers; polyacrylacrylate, polyacetal (co) polymers; resins primarily composed of these resins; or copolymers formed of monomers that constitute the aforementioned (co)polymers. They may be used singly or in combinations of two or more. Of these materials are preferred, from the viewpoint of resistance to heat, polyester resins such as polycarbonate resin, polybutylene terephthalate resin, and polyethylene terephthalate resin; and polyarylene sulfide resin. Also, from the viewpoints of cost and balance of properties such as specific gravity, fluidity, and bending characteristics, there are preferred mixtures of polycarbonate resin and ABS resin and mixtures of polycarbonate resin, and polyalkylene terephthalate resin and/or amorphous polyarylate resin. Typical examples of amorphous polyarylate include those containing bisphenol A and a terephthalic acid/isophthalic acid mixture.

The thermoplastic resin which is used in the present invention also encompasses thermoplastic resins obtained by adding, to a thermoplastic resin, additives such as a nucleating agent, a pigment such as carbon black, an antioxidant, a stabilizer, a plasticizer, a lubricant, a mold-releasing agent, and a fire retardant to thereby impart desired properties.

The liquid crystal polymer (B) is intended to refer to a melt-processable polymer having properties such that it is capable of forming an optically anisotropic melt phase. When shear stress is applied to the liquid crystal polymer (B) in a molten state, the molecular chains of the liquid crystal polymer are regularly aligned in parallel. Polymer molecules having such properties generally have an elongated and flat shape, and exhibit fairly high rigidity along the major axis of the molecule. Under normal circumstances, they have a plurality of extended chain linkages which are either in a coaxial or parallel direction.

Properties of an anisotropic melt phase can be confirmed by a customary poralization method making use of an orthogonal polarizer. More specifically, the presence of an anisotropic melting phase is confirmed under a Leitz poralization microscope by observing a molten sample placed on a Leitz hot stage in an atmosphere of nitrogen with 40 magnifications. The liquid crystal polymer which is used in the present invention shows optical anisotropy, allowing the passage of poralized light therethrough even in the stationary melting state when examined between two orthogonal polarizers.

No particular limitation is imposed on the liquid crystal polymer (B) described above. Generally, aromatic polyesters and aromatic polyester amides are preferred, which encompass polyesters partially containing an aromatic polyester or aromatic polyester amide in the molecule. There are used those compounds that have a logarithmic viscosity number (I.V.) of preferably at least approximately 2.0 dl/g, more preferably between 2.0 and 10.0 dl/g, when dissolved in pentafluorophenol at 60° C. at a concentration of 0.1% by weight.

Particularly preferred aromatic polyesters and aromatic polyester amides that are used as liquid crystal polymers (B) according to the present invention include aromatic polyesters and aromatic polyester amides which contain, as constituents thereof, one or more compounds selected from aromatic hydroxycarboxylic acids, aromatic hydroxyamines, and aromatic diamines. More specifically, the following compounds (1) to (4) are used: (1) polyesters mainly composed of one or more compounds selected from aromatic hydroxycarboxylic acids and derivatives thereof; (2) polyesters mainly composed of (a) one or more compounds selected from aromatic hydroxycarboxylic acids and derivatives thereof, (b) one or more compounds selected from aromatic dicarboxylic acids, alicyclic dicarboxylic acids and derivatives thereof, and (c) one or more compounds selected from aromatic diols, alicyclic diols, aliphatic diols and derivatives thereof; (3) polyester amides mainly composed of (a) one or more compounds selected from aromatic hydroxycarboxylic acids and derivatives thereof, (b) one or more compounds selected from aromatic hydroxyamines, aromatic diamines and derivatives thereof, and (c) one or more compounds selected from aromatic dicarboxylic acids, alicyclic dicarboxylic acids and derivatives thereof; and (4) polyester amides mainly composed of (a) one or more compounds selected from aromatic hydroxycarboxylic acids and derivatives thereof, (b) one or more compounds selected from aromatic hydroxyamines, aromatic diamines and derivatives thereof, (c) one or more compounds selected from aromatic dicarboxylic acids, alicyclic dicarboxylic acids and derivatives thereof, and (d) one or more compounds selected from aromatic diols, alicyclic diols, aliphatic diols and derivatives thereof. Besides the above-described constituents, molecular weight regulators may also be used as required.

Specific examples of preferred compounds which constitute the above-mentioned liquid crystal polymers that may be used in the present invention include aromatic hydroxy carboxylic acids such as p-hydroxybenzoic acid, 6-hydroxy-2-naphthoic acid; 2,6-dihydroxynaphthalene, 1,4-dihydroxynaphthalene, 4,4'-dihydroxybiphenyl, hydroquinone, resorcin, aromatic diols of the below-described formula [1] or [2], aromatic dicarboxylic acids such as terephthalic acid, isophthalic acid, 4,4'-diphenyldicarboxylic acid, 2,6-naphthalene dicarboxylic acid, and the compounds represented by the below-described formula [3], and aromatic amines such as p-aminophenol and p-phenylenediamine:

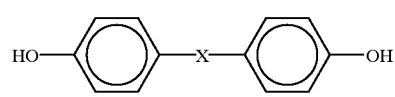

[1]

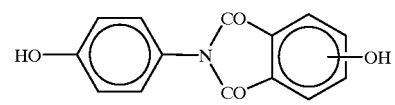

[2]

-continued

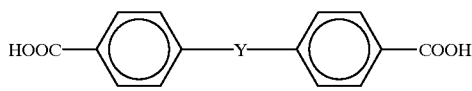
[3]

wherein

X is a group selected from the group consisting of a C1–C4 alkylene, alkylidene, —O—, —SO—, —SO$_2$—, —S— and —CO—;

Y is a group selected from the group consisting of —(CH$_2$)$_n$— (n is a number of 1 to 4) and —O(CH$_2$)$_m$O— (m is a number of 1 to 4).

Especially preferred liquid crystal polymers (B) used in the present invention include aromatic polyesters which contain, as main structural components, p-hydroxybenzoic acid and 6-hydroxy-2-naphthoic acid.

In the second object of the present invention, i.e., in the injection molding method making use of a thermoplastic resin composition, the thermoplastic resin composition which is used is formed of the aforementioned thermoplastic resin (A) and liquid crystal polymer (B). The proportions of thermoplastic resin (A) and liquid crystal polymer (B) are such that the former is between 99 and 50 wt. %, preferably between 90 and 75 wt. %, and the latter is between 1 and 50 wt. %, preferably 10 and 35 wt. % (the total of the two being 100 wt. %). When liquid crystal polymer (B) is present in the range of 1 to 50 wt. %, the below-described matrix phase will not be reversed, and in addition, thermoplastic resin (A) can be reinforced by liquid crystal polymer (B). Moreover, when the composition is observed after a heat treatment is performed at a temperature not lower than the melting point of the liquid crystal polymer under a non-load state and then cooling is performed, the liquid crystal polymer (B) is required to be microscopically dispersed in the form of islands in the matrix phase of the thermoplastic resin (A). The state of dispersion of the liquid crystal polymer (B) is such that the liquid crystal polymer (B) has a weight average particle diameter within the range of 10 to 40 micrometers, preferably 15 to 30 micrometers, and at least 80 wt. % of the liquid crystal polymer has a particle diameter within the range of 0.5 to 60 micrometers, preferably 5 to 50 micrometers.

The above-mentioned heat treatment is performed for the puropose of making the liquid crystal polymer (B) have a spherical shape that allows easy observation even when the polymer is dispersed in shapes other than the spherical shape. The temperature of the heat treatment suffices if it is not lower than the melting point of the liquid crystal polymer (B). In order to achieve perfect melting of the liquid crystal polymer and formation of perfect spheres thereof, it is preferred that the heat treatment be performed at a temperature at least 10° C. higher than the melting point while standing for a period of at least 20 seconds, particularly preferably for 30 seconds to 3 minutes. If there remains dispersed particles having a nonspherical shape, the time of the heat treatment may be prolonged. However, for a certain combination of the thermoplastic resin (A) and the liquid crystal polymer (B), prolonged heat treatment time may invite the risk of clustering the molten spherical liquid crystal polymer (B) to thereby affect its microscopic dispersion state. Therefore, instead of extending the heat treatment time, the diameter of a spherical equivalent is preferably used for evaluation.

In order to manufacture a thermoplastic resin composition in which liquid crystal polymer (B) is microscopically dispersed in the form of islands in the matrix phase of thermoplastic resin (A) as observed when the composition is cooled after it has undergone the aforementioned heat treatment, the two components are blended at the aforementioned proportions and kneaded. Generally speaking, kneading is performed by use of an extruder, whereby the kneaded material is extruded in the form of pellets, which are used in the subsequent injection molding step. However, the process is not limited to such kneading by use of an extruder. In the kneading method, there may be used a single- or a twin-screw extruder, which are used for kneading and extruding ordinary thermoplastic resins. In order to obtain a thermoplastic resin composition having the aforementioned dispersion state, several methods may be used: (1) a method in which the melt viscosity ratio (Aη/Bη) of thermoplastic resin (A) to liquid crystal polymer (B) is at least 0.1, preferably at least 0.1 and less than 6, when measured at a processing temperature greater than or equal to the flow beginning temperature of the liquid crystal polymer (B) and at a shear rate of 1,200 sec$^{-1}$; (2) a method in which a dispersion aid for liquid crystal polymer (B) is used; (3) a method in which kneading and extrusion are repeatedly performed; and (4) a method in which the liquid crystal polymer (B) to be blended is pulverized in advance. These methods may be used singly as suitably selected or in combinations. Of these methods, from the viewpoints of availability with ease of the aforementioned microscopically dispersed thermoplastic resin composition, it is preferred that there be used method (1) in which a melt viscosity ratio is limited within a predetermined range, and method (2) in which a dispersion aid for liquid crystal polymer (B) is used. When method (1) is used, if the melt viscosity ratio is smaller than 0.1, the viscosity of the matrix phase (thermoplastic resin) comes to be excessively low, to thereby become unable to apply a sufficient shear force and elongation stress to the liquid crystal polymer (B). As a result, the liquid crystal polymer is difficult to be imparted with a fibrous shape. On the other hand, when the melt viscosity ratio is in excess of 6, the liquid crystal polymer (B) can be made to have a fibrous form. However, since the diameter of a fiber of the fibrous liquid crystal polymer becomes thick due to the increased viscosity of the thermoplastic resin (A), there may arise problems such as less reinforcing effect of the product or poor fluidity during molding. An example of cases in which a dispersion aid as used in method (2) is preferably used is a case in which an aromatic polyester or aromatic polyester amide, particularly the former, is used as the liquid crystal polymer (B), and polycarbonate resin is used as the thermoplastic resin (A).

The flow beginning temperature of liquid crystal polymer (B) is a temperature at which the liquid crystal polymer (B) exhibits fluidity when an external force is applied thereto, and is determined by use of the method described later.

Preferable dispersion aids are phosphorus-containing compounds, which include phosphorylated products, phosphoric compounds, and phosphorous compounds. Specific examples thereof include tetrakis(2,4-di-t-butylphenyl)-4,4'-biphenylenephosphite, bis(2,4,6-tri-t-butylphenyl)-pentaerythritol diphosphite, bis (2,6-di-t-butyl-4-methylphenyl)pentaerythritol diphosphite, and tris(2,4-di-t-butylphenyl)phosphite. Of these compounds, phosphorous compounds are preferred, and pentaerythritol-type phosphorous compounds are particularly preferred.

The amount of dispersion aids, particularly phosphorus-containing compounds, to be incorporated is preferably from 0.01 to 0.5 parts by weight, more preferably from 0.05 to 0.3 parts by weight, with respect to 100 parts by weight in total of thermoplastic resin (A) and liquid crystal polymer (B).

The thermoplastic resin composition which is used in the second aspect, i.e., the injection molding method, of the present invention must be such that when the thermoplastic resin composition is heat-treated and then cooled, the liquid crystal polymer (B) contained therein is microscopically dispersed to the aforementioned degree. Although the liquid crystal polymer (B) may be in a fibrous form as disclosed in aforementioned Japanese Patent Application Laid-Open (kokai) Nos. 5-112709 and 5-70700, it is not required to have a fibrous form. Accordingly, there is no necessity to perform, after the composition exits an extruder and while it is in a molten state, an orientation-rolling process for establishing an oriented fibrous form as disclosed in those publications. According to the present invention, the thermoplastic resin composition, in which the liquid crystal polymer (B) is dispersed in the aforementioned state, is injection molded under the conditions which will be described later, thereby readily causing microscopically dispersed particles of the liquid crystal polymer (B) to assume a fibrous form at a relatively large aspect ratio. Therefore, fibers are uniformly formed within an injection molded article, thereby readily providing a higher strength and a higher rigidity as compared with an injection molded article obtained by a known method and containing the same proportion of the liquid crystal polymer (B).

The injection molding method according to the second aspect of the present invention will next be described. The injection molding method of the present invention is characterized by the injection molding conditions described below under which the injection molding is performed by use of the aforementioned thermoplastic resin composition, in which the liquid crystal polymer (B) is microscopically dispersed in the matrix phase of the thermoplastic resin (A).

A first injection molding condition relates to the temperature of the thermoplastic resin composition during injection (processing temperature). The processing temperature is not lower than the flow beginning temperature of the liquid crystal polymer (B), and is preferably at least 10° C. higher than the flow beginning temperature. Under this temperature condition, when the thermoplastic resin composition in a fluidized state passes a gate of an injection molding machine leading to a mold cavity, the liquid crystal polymer (B), which is microscopically dispersed in the form of islands in the matrix phase of the thermoplastic resin (A), is sufficiently stretched to assume a fibrous form. The establishment of this fibrous form enhances the function of the dispersed state of the liquid crystal polymer (B), thereby yielding an injection molded article having high rigidity and high strength. If the liquid crystal polymer (B) is dispersed in the form of islands but not microscopically, the quantity of the liquid crystal polymer (B) which becomes fibrous decreases, resulting in a potential failure to yield an injection molded article having high rigidity and high strength. Therefore, it is important to meet the requirement that the liquid crystal polymer (B) be microscopically dispersed in the form of islands. In view of energy conservation and the prevention of thermal decomposition of the thermoplastic resin composition, the upper limit of the aforementioned resin temperature is preferably not higher than the thermal decomposition temperature of the liquid crystal polymer (B), particularly preferably not higher than the melting point of the liquid crystal polymer (B) plus 50° C.

For a composition comprising a resin having a melting point similar to that of a liquid crystal polymer, such as a polyarylene sulfide resin or the like, the processing temperature thereof is preferably not lower than its melting point. However, for a general thermoplastic resin, such as a polybutylene terephthalate resin or the like, the upper limit of a processible temperature thereof is around the melting point of a liquid crystal polymer, and therefore a processing temperature thereof is preferably not lower than the flow beginning temperature (liquid crystal state beginning temperature) of the liquid crystal polymer and lower than the melting point of the liquid crystal polymer.

The "processing temperature" in the present invention denotes a preset temperature of a resin processing machine such as a molding machine. However, even the case in which the preset temperature is not higher than the flow beginning temperature (liquid crystal state beginning temperature) of a liquid crystal polymer is encompassed by the invention if the resin temperature is not lower than the flow beginning temperature (liquid crystal state beginning temperature).

A second injection molding condition relates to the gate passage rate of the molten thermoplastic resin composition which passes the aforementioned gate. The gate passage rate is at least 500 m/min, preferably at least 1,000 m/min, more preferably at least 3,000 m/min. When the thermoplastic resin composition is injection molded at this gate passage rate as well as at the aforementioned processing temperature, the liquid crystal polymer (B) sufficiently becomes fibrous through stretching associated with the passage of the thermoplastic resin composition through the gate. A higher gate passage rate is preferred. However, in view of performance of ordinary molding machines or the like, the upper limit of the gate passage rate is preferably not higher than 100,000 m/min. When a high-speed injection molding machine is used, a gate passage rate of 100,000 m/min or higher is possible.

In a mold used for the above-described injection molding, the ratio of the cross section of a gate, $S_G$, to the cross section of a runner, $S_R$, or $S_R/S_G$, is preferably 3 to 150, particularly preferably 6 to 120, so as to promote the fiber formation of the liquid crystal polymer (B), and to increase the aspect ratio of fibers formed in a matrix phase. The cross section of a gate and that of a runner are defined for each type of gate shown in FIG. 1. For a gate having an unillustrated shape, the cross section of a gate and that of a runner may be defined likewise. For a side gate and a film gate of FIG. 1(a) and an overlap gate of FIG. 1(b), if $S_X$ (cross section)>$S_Y$ (cross section) then $S_G=S_Y$, if $S_X<S_Y$ then $S_G=S_X$, and if $S_X=S_Y$ then $S_G=S_X=S_Y$. For a pin gate of FIG. 1(c), if $S_X>S_Y$ then $S_R=S_X$, if $S_X<S_Y$ then $S_R=S_Y$, and if $S_X=S_Y$ then $S_R=S_X=S_Y$. For a direct gate of FIG. 1(d), $S_R$ represents the area of the base of a circular cone of a runner having a circular cone shape, and $S_G$ represents the area of the peripheral surface of a hypothetical circular cylinder which is formed just under the base of the circular cone. For a disk gate of FIG. 1(e), $S_R$ represents the area of the base of an illustrated circular cone, and $S_G$ represents the area of the peripheral surface of a hypothetical circular cylinder which, like that of the direct gate, is formed in the illustrated gate.

A resin pressure during injection molding is appropriately determined so as to fulfill the required gate passage rate of the molten thermoplastic resin composition which passes a gate, and is usually 300 to 2,000 kg/cm², preferably 500 to 1,500 kg/cm².

According to the third aspect of the present invention, there is provided an injection molded article obtained by the aforementioned injection molding method, the injection molded article being characterized by the liquid crystal polymer (B) dispersed in a fibrous form in the matrix phase of the thermoplastic resin (A) at a mean aspect ratio of at least 6, preferably at least 8. Further, it is a notable feature that the liquid crystal polymer (B) is microscopically dispersed in the form of islands in the matrix phase of the thermoplastic resin (A) so that when the injection molded article is heat-treated at a temperature not lower than the melting point of the liquid crystal polymer (B) under a non-load state so as to relax the fibrous liquid crystal polymer (B) and is then cooled to room temperature, the liquid crystal polymer (B) has a weight average particle diameter within the range of 10 to 40 micrometers and at least 80 wt. % thereof has a particle diameter within the range of 0.5 to 60 micrometers. In this case, the heat-treatment temperature and a retention time are similar to those for the thermoplastic resin composition which is used in the second aspect, i.e., in the injection molding method, of the invention. The state of dispersion of the liquid crystal polymer (B) observed when the thermoplastic resin composition used in the second aspect of the invention is heat-treated at a temperature not lower than the melting point of the liquid crystal polymer (B) and is then cooled remains almost unchanged even after the thermoplastic resin composition is re-kneaded and is then passed through a gate under the aforementioned injection molding conditions. Therefore, through the aforementioned heat treatment of an injection molded article and the subsequent observation of the state of dispersion of the liquid crystal polymer (B), it becomes possible to readily determine whether the injection molded article conforms to the third aspect of the invention, as well as whether it is formed of the thermoplastic resin composition as described above.

Among injection molded articles according to the third aspect of the present invention, a particularly preferred injection molded article, which is an injection molded article according to a fourth aspect of the present invention, has a flexural modulus of at least 40,000 kg/cm$^2$ as measured in accordance with ASTM D790. A flexural modulus falling within this range indicates that a required reinforcing effect is attained through the microscopic dispersion of a liquid crystal polymer and the formation of fibers. Unless an injection molded article has as high a flexural modulus as required above, it is difficult for the injection molded article to be used as material for housing. The upper limit of a flexural modulus is not particularly limited, but is usually 150,000 kg/cm$^2$.

The aforementioned preferred injection molded article exhibits good moldability due to good fluidity, which is represented by the fact that the preferred injection molded article, when re-molten, falls within the range of a melt viscosity of 400 to 2,500 poise, particularly 500 to 1,500 poise, as measured at a temperature of the melting point of a liquid crystal polymer plus 10° C. and a shear rate of 1200 sec$^{-1}$. Accordingly, in order to efficiently manufacture an injection molded article, the melt viscosity of the injection molded article preferably falls within this range.

The aforementioned preferred injection molded article, even when thin-walled, has excellent mechanical properties. Accordingly, when a thin-walled injection molded article is such that at least 50%, particularly at least 70% of the walls thereof have a thickness of not more than 1 mm, advantages thereof can be best utilized. Examples of such a thin-walled injection molded article include housings of electronic devices, more specifically, components of personal computers, components of cellular phones, connectors, CD pickup components, components of hard disk drives, and their peripheral components.

According to the fifth aspect of the present invention, there are provided an injection molding method and an injection-molded article, in which the thermoplastic resin composition used therefor comprises a specifically selected combination of the aforementioned thermoplastic resin (A) not forming an anisotropic melt phase and the aforementioned liquid crystal polymer (B) capable of forming an anisotropic melt phase. Also, as described in detail hereinabove, there are provided an injection molding method and an injection molded article obtained by use of the method, in which such a specific thermoplastic resin composition is used.

Of thermoplastic resins (A), thermoplastic resins (A') which contain one or more members of polyolefin (co) polymers, styrene (co)polymers, polyamide (co)polymers, polyacrylate, and polyacetal (co)polymers are relatively inexpensive and exhibit excellent slidability and impact properties. However, they have drawbacks in terms of their physical properties, such as poor resistance to heat and poor rigidity. Particularly when they are attempted to be used for forming thin-wall housings, their shortage of melt resin fluidity and rigidity during manufacture limits their design to only thick walls. Therefore, the recent trend of reducing size and weight in the fields of electrical devices, electronics, and telecommunications has faced a limitation. Moreover, when the melting point of the liquid crystal polymer (B) to be blended the thermoplastic resin (A') is excessively high, the resin (A') may decompose during processing, and therefore, there has remained the problem that the inherent advantage possessed by the thermoplastic resin (A') is hardly exploited. This problem is solved when a thermoplastic resin composition comprising a specific combination of the aforementioned thermoplastic resin (A') and liquid crystal polymer (B') is used.

Accordingly, in the fifth aspect of the present invention there is employed a thermoplastic resin composition comprising 99 to 50 wt. % of a thermoplastic resin (A') having a melting point or a softening point of not higher than 210° C. and being formed of one or more members selected from among polyolefin (co)polymers, styrene (co)polymers, polyamide (co)polymers, polyacrylate, and polyacetal (co) polymers and 1 to 50 wt. % of a liquid crystal polymer (B') having a flow beginning temperature of 80–210° C. and being capable of forming an anisotropic melt phase (the total of the two accounting for 100 wt. %), characterized in that the melt flow rate (MFR) of the thermoplastic resin (A') is between 0.15 and 100 as measured at a processing temperature of the thermoplastic resin composition, and the liquid crystal polymer (B') is microscopically dispersed in the form of islands in the matrix phase of the thermoplastic resin (A') so that when the thermoplastic resin composition is heat-treated at a temperature greater than or equal to the melting point of the liquid crystal polymer (B') under a non-load state and is then cooled, the liquid crystal polymer (B') has a weight average particle diameter within the range of 10 to 40 micrometers and at least 80 wt. % thereof has a particle diameter within the range of 0.5 to 60 micrometers.

The present invention also provides an injection molding method of a thermoplastic resin composition as described above, wherein the viscosity ratio (A'η/B'η) of thermoplastic resin (A') to liquid crystal polymer (B') is at least 0.1 when measured at a processing temperature greater than or equal to the flow beginning temperature of the liquid crystal polymer (B') and at a shear rate of 1,200 sec$^{-1}$.

The present invention also provides an injection molding method of a thermoplastic resin composition as described above, wherein the liquid crystal polymer (B') is formed of a structural unit having aromatic hydroxycarboxylic acid/ aliphatic diol/aromatic dicarboxylic acid.

The present invention also provides an injection molding method of a thermoplastic resin composition as described above, wherein the liquid crystal polymer (B') is formed of a structural unit having aromatic hydroxycarboxylic acid/ ethylene glycol/terephthalic acid, and the aromatic hydroxycarboxylic acid content is between 30 and 70 mole %.

The present invention also provides an injection molding method of a thermoplastic resin composition as described above, wherein the aromatic hydroxycarboxylic acid is p-hydroxybenzoic acid.

The present invention also provides an injection molding method of a thermoplastic resin composition as described above, wherein the aromatic hydroxycarboxylic acid comprises p-hydroxybenzoic acid and 6-hydroxy-2-naphthoic acid.

The present invention also provides an injection molding method by use of a thermoplastic resin composition, characterized in that the aforementioned thermoplastic resin composition is injection-molded at a processing temperature greater than or equal to the flow beginning temperature of the liquid crystal polymer (B') and at a gate passage rate of the molten resin of at least 500 m/min.

The present invention also provides an injection molding method by use of a thermoplastic resin composition, characterized in that the thermoplastic resin composition is injection-molded at a processing temperature greater than or equal to the flow beginning temperature of the liquid crystal polymer (B') and at a gate passage rate of the molten resin of at least 500 m/min, and through use of a mold for injection molding having a ratio $S_R/S_G$ of between 3 and 150, wherein $S_G$ and $S_R$ represent the cross sectional area of a gate of the mold and the cross sectional area of a runner of the mold, respectively.

The present invention also provides an injection molded article formed of any one of the thermoplastic resin compositions as described above, characterized in that the liquid crystal polymer is dispersed in the matrix phase of the thermoplastic resin (A') at a mean aspect ratio of at least 6, and that the liquid crystal polymer (B') is microscopically dispersed in the form of islands in the matrix phase of the thermoplastic resin (A') so that when the injection-molded article is heat-treated at a temperature not lower than the melting point of the liquid crystal polymer (B') under a non-load state and is then cooled, the liquid crystal polymer (B') has a weight average particle diameter within the range of 10 to 40 micrometers and at least 80 wt. % thereof has a particle diameter within the range of 0.5 to 60 micrometers.

Examples of the thermoplastic resin (A') include, but are not limited to, polyolefin (co)polymers such as polyethylene, polypropylene, and poly4-methyl-1-pentene; styrene (co)polymers such as ABS resin, AES, AE, and PS resins, polyamide (co) polymers, polyacrylate, polyacetal (co)polymers, and resins primarily formed of these resins. They may be used singly or in combinations of two or more. These thermoplastic resins are preferred from to different reasons: the polyolefin (co)polymers exhibit well-balanced properties in spite of their very low prices, the styrene (co)polymers exhibit suppressed mold shrinkage, polyamide (co)polymers exhibit relatively good resistance to heat, and polyacetal (co)polymers exhibit good sliding properties. Generally, the listed (co)polymers have a melting point or a softening point of not higher than 210° C. These thermoplastic resins (A') will further be described in detail below.

The aforementioned polyacetal resins are polymers containing an oxymethylene unit —(OCH$_2$)— as the primary structural unit. They may be copolymers, terpolymers, or block polymers, and contain as their major recurrent unit a polyoxymethylene homopolymer or an oxymethylene group, and also contain small amounts of other structural units such as comonomer units of ethylene oxide, 1,3-dioxolane, 1,4-butanediol and formal. Also, their molecular configuration may be linear, branched, or cross-linked. Moreover, they may be known modified polyoxymethylenes to which other organic groups have been introduced. Their polymerization degree is not particularly limited so long as they exhibit moldability; for example it suffices if they have a melt flow rate of 0.15–100 g/10 min., preferably 0.5–50 g/min. as measured at 190° C. under a load of 2,160 g.

Examples of the aforementioned polyolefin (co)polymers include homopolymers of alpha-olefins such as ethylene, propylene, butene, hexene, octene, nonene, decene, and dodecene; random, block, or graft copolymers formed of two or more of them; and random, block, or graft copolymers containing any one of them and a non-conjugated diene such as 1,4-hexadiene, dicyclopentadiene, 5-ethylidene-2-norbornane, or 2,5-norbornadiene, a conjugated diene component such as butadiene, isoprene, or piperylene, alpha, beta-unsaturated acids such as acrylic acid or methacrylic acid or esters or other derivatives thereof; aromatic vinyl compounds such as acrylonitrile, styrene, or alpha-methylstyrene; vinyl esters such as vinyl acetate; and vinyl ethers such as vinyl methyl ether; and derivatives of these vinyl compounds. No limitation is imposed on their polymerization degree, presence or absence, or the quantity if present, of a side chain or branching, and on the proportions of the components to be copolymerized.

The aforementioned styrene (co)polymers primarily contain styrene, and are obtained through a radical polymerization or ionic polymerization. Any styrene (co)polymers industrially produced through a block polymerization, solution polymerization, suspension polymerization, emulsion polymerization, etc. may be used. Also, so long as their properties are not greatly impeded, reactive monomers such as vinyl compounds and diene compounds may be copolymerized with the major component styrene, or alternatively, a rubber component may be introduced. Particularly, there are preferably used those copolymers that contain polystyrene, poly-alpha-methylstyrene, or both as a major component or components, which is or are copolymerized with acrylic acid or methacrylic acid, esters thereof, acrylonitrile, butadiene, or ethylene chloride. Again, no limitation is imposed on their polymerization degree, presence or absence, or the quantity if present, of a side chain or branching, and on the proportions of the components to be copolymerized. Specific examples include PS, HIPS, AS, AES, ABS, and MBS.

Examples of the aforementioned polyamide (co)polymers include polyamide obtained from omega-amino acid or omega-lactum or homopolymers, copolymers, and mixtures thereof produced by use of a diamine, m-xylene diamine, and a dicarboxylic acid such as adipic acid, sebacic acid, dodecanedionic acid, cyclohexane dicarboxylic acid, terephthalic acid, or isophthalic acid. Examples of preferred polyamides include homopolyamides such as nylon 6, nylon 11, nylon 12, nylon 46, nylon 66, etc. and copolymerized polyamides such as adipic acid/terephthalic acid/hexamethylenediamine, adipic acid/1,4-cyclohexane dicarboxylic acid/hexamethylenediamine, adipic acid/1,3-cyclohexane dicarboxylic acid/hexamethylenediamine, terephthalic acid/isophthalic acid/hexamethylenediamine/p-aminocyclohexylmethane, etc.

The thermoplastic resin (A') referred to in the present invention also encompasses thermoplastic resins obtained by adding, to the above-mentioned thermoplastic resins, additives such as a nucleating agent, a pigment such as carbon black, an antioxidant, a stabilizer, a plasticizer, a lubricant, a mold-releasing agent, and a fire retardant to thereby impart desired properties.

As regards liquid crystal polymer (B'), the descriptions provided hereinabove for liquid crystal polymer (B) also apply to them. Among the illustrated liquid crystal polymers (B), the term liquid crystal polymer (B') is intended to encompass melt-processable polymers having a flow beginning temperature of 80–210° C. and being capable of forming an optically anisotropic melt phase. In consideration of the condition of the flow beginning temperature of 80–210° C., particularly preferred liquid crystal polymers (B') are aromatic polyesters having structural units of hydroxycarboxylic acid, ethylene glycol, and terephthalic acid. In this case, the aromatic hydroxycarboxylic acid content with respect to the entire structural monomers is 30–70 mole %, preferably 35–55 mole %, and particularly preferably 40–45 mole %. Moreover, it is preferred that the aromatic hydroxycarboxylic acid be p-hydroxybenzoic acid, or a mixture of p-hydroxybenzoic acid and 6-hydroxy-2-naphthoic acid. In the latter case, the molar ratio of p-hydroxybenzoic acid to 6-hydroxy-2-naphthoic acid is preferably between 50:50 and 70:30, and more preferably between 55:45 and 65:35. The liquid crystal polymer (B') used in the present invention may contain an oligomer region as a result of polymerization of the aforementioned combinations of components.

The thermoplastic resin composition used in the fifth aspect of the present invention comprises the aforementioned thermoplastic resin (A') and the aforementioned liquid crystal polymer (B'). The proportion of the thermoplastic resin (A') is 99 to 50 wt. %, preferably 95 to 60 wt. %, while the proportion of the liquid crystal polymer (B') is 1 to 50 wt. %, preferably 5 to 40 wt. % (the total of the two makes 100 wt. %). When the liquid crystal polymer (B') falls within the range of a proportion of 1 to 50 wt. %, the matrix phase of the thermoplastic resin (A') is not inverted, and the liquid crystal polymer (B') reinforces the thermoplastic resin (A'). When the thermoplastic resin composition is heat-treated at a temperature not lower than the melting point of the liquid crystal polymer (B') under a non-load state and is then cooled to room temperature, the thus-processed thermoplastic resin composition, when observed, must be such that the liquid crystal polymer (B') is microscopically dispersed in the form of islands in the matrix phase of the thermoplastic resin (A'). The dispersed liquid crystal polymer (B') has a weight average particle diameter within the range of 10 to 40 micrometers, preferably 15 to 30 micrometers, and at least 80 wt. % thereof has a particle diameter within the range of 0.5 to 60 micrometers, preferably 5 to 50 micrometers.

The above-mentioned heat treatment is performed for the purpose of changing the shape of the liquid crystal polymer (B'), which may be dispersed in shapes other than a spherical shape, to a spherical shape for convenience of observation. The thermoplastic resin composition may be heat-treated at a temperature not lower than the melting point of the liquid crystal polymer (B'), preferably 10° C. or more higher than the melting point, and is left to stand at the heat treatment temperature for at least 20 seconds, preferably for 30 seconds to 3 minutes, so that the liquid crystal polymer (B') is completely melted and assumes a spherical shape. If there remain dispersed particles having a nonspherical shape, the time of the heat treatment may be prolonged. However, for a certain combination of the thermoplastic resin (A') and the liquid crystal polymer (B'), a relatively long heat treatment may cause spherical particles of the molten liquid crystal polymer (B') to aggregate, resulting in a potential change in the microscopically dispersed state of the liquid crystal polymer (B'). Therefore, instead of extending the heat treatment time, the diameter of a spherical equivalent is preferably used for evaluation.

In order to manufacture a thermoplastic resin composition in which, when heated and then cooled as described above, the liquid crystal polymer (B') is microscopically dispersed in the form of islands in the matrix phase of the thermoplastic resin (A'), the thermoplastic resin (A') and the liquid crystal polymer (B') may be blended in the aforementioned amounts, followed by kneading. Usually, the thus-prepared thermoplastic resin composition is kneaded and extruded in the form of pellets by an extruder, followed by injection molding. Means for kneading a thermoplastic resin composition is usually, but is not limited to, a single- or twin-screw extruder. In order to obtain a thermoplastic resin composition in which the liquid crystal polymer (B') is dispersed as described above, any of the following methods may be selected as appropriate, or two of the following methods may be used in combination: (1) the melt viscosity ratio (A'η/B'η) between the thermoplastic resin (A') and the liquid crystal polymer (B') is made to be at least 0.1, preferably 0.1 to 6, as measured at a processing temperature not lower than the flow beginning temperature of the liquid crystal polymer (B') and a shear rate of 1200 sec$^{-1}$; (2) kneading and extrusion is repeated; and (3) the liquid crystal polymer (B') is pulverized before it is blended. In view of readiness of obtaining a thermoplastic resin composition in which the liquid crystal polymer (B') is microscopically dispersed as described above, method (1) is preferred in which a melt viscosity ratio is set within a specific range. When the melt viscosity ratio is not higher than 0.1, the viscosity of the matrix phase of the thermoplastic resin (A') is too low to apply a sufficient shear stress or stretch stress to the liquid crystal polymer (B'), resulting in a difficulty for the liquid crystal polymer (B') to become fibrous. When the melt viscosity ratio is in excess of 6, the liquid crystal polymer (B') becomes fibrous, but due to an increased viscosity of the thermoplastic resin (A'), the following problems arise: the fiber diameter of the fibrous liquid crystal polymer (B') increases, and thus the reinforcing action of the liquid crystal polymer (B') becomes ineffective; and the fluidity of the thermoplastic resin composition decreases during molding.

The flow beginning temperature of the liquid crystal polymer (B') is a temperature at which the liquid crystal polymer (B') exhibits fluidity when an external force is applied thereto in the course of heating the liquid crystal polymer (B').

Applicable to the thermoplastic resin composition according to the fifth aspect of the present invention are the injection molding method, the first and second injection molding conditions, the mold used in injection molding, the resin pressure during injection molding, and the features of an injection molded article obtained by the injection molding method which have been described in the paragraphs of the second and third aspects of the present invention.

In injection molded articles provided by the present invention, a liquid crystal polymer is well dispersed in the matrix phase of a thermoplastic resin, and particles of the liquid crystal polymer are fibrous at a relatively large aspect ratio. Thus, such injection molded articles have high rigidity and high strength, and prove to be particularly useful when thin-walled because of improved mechanical properties.

In injection molded articles provided by the present invention, a liquid crystal polymer is contained therein in a fibrous form and functions as a reinforcement. Therefore, it is not necessary to blend in a reinforcement filler, which is usually blended in. However, a known fibrous, granular, plate-like, or hollow-shaped filler may be blended in so long as the effect of the invention is not hindered.

The present invention will next be described by way of example, which should not be construed as limiting the invention. Methods of testing an injection molded article for its properties are described below.

Melt Flow Rate (MFR):

A melt flow rate (g/10 minutes) was measured at a processing temperature in accordance with ASTM D1238-89E.

Vicat Softening Point:

A vicat softening point was measured in accordance with JIS K6870.

Flexural Modulus:

A bending test piece having a thickness of 1/16 inch was tested for a flexural modulus (kg/cm$^2$) in accordance with ASTM D790. For Examples 10 and 11 and Comparative Example 4, an injection molded article having a cellular phone shape as schematically shown in FIG. 1 was prepared, and subsequently a hatched portion was cut out to be likewise tested in accordance with ASTM. The following properties were also evaluated in a similar manner.

In Example 12 and subsequent Examples, a bending test piece having a thickness of 1/32 inch was tested for a flexural modulus (kg/cm$^2$) in accordance with ASTM D790.

Mean Aspect Ratios of Fibers of a Liquid Crystal Polymer:

A test piece which was used for measuring a flexural modulus was cut so as to obtain a plane parallel to a direction of fluidization. The thus-cut surface was mirror-polished, and subsequently the polished surface was observed through an electron microscope. 50 fibers of a liquid crystal polymer were arbitrarily selected to measure their thickness and length. The length of an observable portion of the liquid crystal polymer on the surface was measured as a fiber length. Measurements are represented in the following manner: O for a mean aspect ratio of not less than 8; Δ for a mean aspect ratio of 8 to 6; and X for a mean aspect ratio of less than 6.

Diameter of Dispersed Particles of Liquid Crystal Polymer:

A portion of pellets obtained by a melt-kneading process or of an injection molded test piece was heated to a temperature 10° C. higher than the melting point of a liquid crystal polymer in a nitrogen gas flow, was maintained at the temperature for 3 minutes, and was then cooled to room temperature. The thus-treated sample was cut, and subsequently the cut surface was observed through an electron microscope. 50 particles of the liquid crystal polymer were arbitrarily selected to measure their diameter. A weight average particle diameter was obtained from measured diameters.

Melt Viscosity:

A test piece was pulverized to be tested for a melt viscosity on a Capillograph manufactured by Toyo Seiki Co., Ltd. The melt viscosity was measured at a shear stress of 1200 sec$^{-1}$ and a molding temperature (a preset temperature of a cylinder). The melt viscosity, Aη or A'η, of a material thermoplastic resin (A) or (A'), and the melt viscosity, Bη or B'η, of a liquid crystal polymer (B) or (B') were measured at a set temperature of a cylinder for a resin composition. A melt viscosity ratio, Aη/Bη or A'η/B'η, was obtained from measurements of the melt viscosity.

Flow Beginning Temperature:

Using a capillary tube type rheometer (Flow Tester, Model CFT-500, manufactured by Shimadzu Corporation), a sample resin melted through the application of heat at a temperature rise rate of 4° C./min was extruded at a load of 100 kg/cm$^2$ through a nozzle having an inner diameter of 1 mm and a length of 10 mm. A temperature at which an indicated melt viscosity was 48,000 poise was measured as a flow beginning temperature.

EXAMPLE 1

A polycarbonate resin (IUPILON S3000 manufactured by Mitsubishi Gas Chemical Inc.) and a liquid crystal polyester {p-hydroxybenzoic acid and 6-hydroxy-2-naphthoic acid (molar ratio: 70:30) as component monomers; flow beginning temperature 250° C.; melting point 280° C.; logarithmic viscosity 5.7 (dl/g)} were mixed at the ratio by weight of 7:3. 100 parts by weight of the resultant mixture (resin component) and 0.3 parts by weight of bis(2,6-di-t-butyl-4-methyl phenyl)pentaerythritol diphosphite as a phosphorous ester were blended. The resulting blend was melt-kneaded using a 30 mm twin-screw extruder at a resin temperature of 300° C., followed by pelletization. Using an injection molding machine (with a side gate), the thus-obtained pellets were molded into test pieces at a molding temperature of 300° C. (this temperature indicates the preset temperature of a cylinder; resin temperature is higher than this temperature). The thus-obtained test pieces were tested for mechanical properties, melt viscosity, and the mean aspect ratio of a liquid crystal polyester. Test results are shown in Table 1. Table 1 also gives a viscosity ratio (Aη/Bη), at a temperature of 300° C. and a shear rate of 1200 sec$^{-1}$, between a component (A) (material polycarbonate resin) and a component (B) (material liquid crystal polyester), together with those of other examples (Table 2 is similar to Table 1).

When pellets, before being molded into test pieces, were heat-treated under a non-load state, the liquid crystal polyester was observed to be dispersed such that dispersed particles thereof had a weight average particle diameter of 25 μm, and at least 80 wt. % of dispersed particles thereof had a particle diameter within the range of 5 to 45 μm. Molding conditions were as follows:

① Cross section of runner $S_R$/cross section of gate $S_G$: 9.3

② Gate passage rate: 1200 m/min

③ Injection pressure: 800 kg/cm$^2$

④ Injection speed: 5.8 m/min

COMPARATIVE EXAMPLE 1

Pellets comprising a polycarbonate resin and a liquid crystal polyester were obtained in a manner similar to that of Example 1. The thus-obtained pellets were molded into test pieces in a manner similar to that of Example 1 except for the following conditions. Test results are shown in Table 1.

① Cross section of runner $S_R$/cross section of gate $S_G$: 2.3

② Gate passage rate: 300 m/min

③ Injection pressure: 800 kg/cm$^2$

④ Injection speed: 5.8 m/min

When portions of bending test pieces were heat-treated under a non-load state, the liquid crystal polyester was observed to be dispersed such that dispersed particles thereof had a weight average particle diameter of 26 μm, and at least 80 wt. % of dispersed particles thereof had a particle diameter within the range of 5 to 45 μm.

EXAMPLE 2

The same pellets as those of Example 1 were molded into test pieces at a molding temperature of 300° C. using an injection molding machine (with a pin gate). The thus-obtained test pieces were tested for mechanical properties, melt viscosity, and the mean aspect ratio of a liquid crystal polyester. Test results are shown in Table 1.

When pellets, before being molded into test pieces, were heat-treated under a non-load state, the liquid crystal polyester was observed to be dispersed such that dispersed particles thereof had a weight average particle diameter of 25 μm, and at least 80 wt. % of dispersed particles thereof had a particle diameter within the range of 5 to 45 μm. Molding conditions were as follows:

① Cross section of runner $S_R$/cross section of gate $S_G$: 25
② Gate passage rate: 2850 m/min
③ Injection pressure: 1200 kg/cm$^2$
④ Injection speed: 5.8 m/min

EXAMPLE 3

A polyphenylene sulfide resin (melting point; 285° C.; melt viscosity: approx. 1400 poise as measured at a temperature of 310° C. and a shear rate of 1200 sec$^{-1}$) and a liquid crystal polyester used in Example 1 were mixed at the ratio by weight of 7:3. The resulting resin mixture was melt-kneaded using a 30 mm twin-screw extruder at a resin temperature of 310° C., followed by pelletization. Using an injection molding machine (with a side gate), the thus-obtained pellets were molded into test pieces at a molding temperature of 300° C. The thus-obtained test pieces were tested for mechanical properties, melt viscosity, and the mean aspect ratio of a liquid crystal polyester. Test results are shown in Table 1.

When pellets, before being molded into test pieces, were heat-treated under a non-load state, the liquid crystal polyester was observed to be dispersed such that dispersed particles thereof had a weight average particle diameter of 25 μm, and at least 80 wt. % of dispersed particles thereof had a particle diameter within the range of 5 to 45 μm. Molding conditions were as follows:

① Cross section of runner $S_R$/cross section of gate $S_G$: 9.3
② Gate passage rate: 1200 m/min
③ Injection pressure: 1200 kg/cm$^2$
④ Injection speed: 5.8 m/min

EXAMPLE 4

A polybutylene terephthalate resin (600 FP (IV=1.0) manufactured by Polyplastics Co., Ltd.) and a liquid crystal polyester used in Example 1 were mixed at the ratio by weight of 7:3. The resulting resin mixture was melt-kneaded using a 30 mm twin-screw extruder at a resin temperature of 290° C., followed by pelletization. Using an injection molding machine (with a side gate), the thus-obtained pellets were molded into test pieces at a molding temperature of 270° C. The thus-obtained test pieces were tested for mechanical properties, melt viscosity, and the mean aspect ratio of a liquid crystal polyester. Test results are shown in Table 1.

When pellets, before being molded into test pieces, were heat-treated under a non-load state, the liquid crystal polyester was observed to be dispersed such that dispersed particles thereof had a weight average particle diameter of 24 μm, and at least 80 wt. % of dispersed particles thereof had a particle diameter within the range of 6 to 46 μm. Molding conditions were as follows:

① Cross section of runner $S_R$/cross section of gate $S_G$: 9.3
② Gate passage rate: 1200 m/min
③ Injection pressure: 1200 kg/cm$^2$
④ Injection speed: 5.8 m/min

COMPARATIVE EXAMPLE 2

A polycarbonate resin (IUPILON S3000 manufactured by Mitsubishi Gas Chemical Inc.) and a liquid crystal polyester used in Example 1 were mixed at the ratio by weight of 7:3. The resulting resin mixture was melt-kneaded using a 30 mm twin-screw extruder at a resin temperature of 300° C., followed by pelletization. Using an injection molding machine (with a pin gate), the thus-obtained pellets were molded into test pieces at a molding temperature of 300° C. The thus-obtained test pieces were tested for mechanical properties, melt viscosity, and the mean aspect ratio of a liquid crystal polyester. Test results are shown in Table 1.

No particles of the liquid crystal polyester were observed in pellets which were to be molded into test pieces. Molding conditions were as follows:

① Cross section of runner $S_R$/cross section of gate $S_G$: 25
② Gate passage rate: 2850 m/min
③ Injection pressure: 1900 kg/cm$^2$
④ Injection speed: 5.8 m/min

COMPARATIVE EXAMPLE 3

A polybutylene terephthalate resin (400 FP (IV=0.75) manufactured by Polyplastics Co., Ltd.) and a liquid crystal polyester used in Example 1 were mixed at the ratio by weight of 7:3. The resulting resin mixture was melt-kneaded using a 30 mm twin-screw extruder at a resin temperature of 290° C., followed by pelletization. Using an injection molding machine (with a side gate), the thus-obtained pellets were molded into test pieces at a molding temperature of 270° C. The thus-obtained test pieces were tested for mechanical properties, melt viscosity, and the mean aspect ratio of a liquid crystal polyester. Test results are shown in Table 1.

When pellets, before being molded into test pieces, were heat-treated under a non-load state, the liquid crystal polyester was observed to be dispersed such that dispersed particles thereof had a weight average particle diameter of 40 μm, and at least 80 wt. % of dispersed particles thereof had a particle diameter within the range of 10 to 70 μm. Molding conditions were as follows:

① Cross section of runner $S_R$/cross section of gate $S_G$: 9.3
② Gate passage rate: 1200 m/min
③ Injection pressure: 1200 kg/cm$^2$
④ Injection speed: 5.8 m/min

EXAMPLE 5

A blend (NOVALLOY S1500 manufactured by Daicel Chemical Industries, Ltd.; PC:ABS=7:3) of a polycarbonate resin (PC) and an ABS resin, and a liquid crystal polyester used in Example 1 were mixed at the ratio by weight of 7:3. 100 parts by weight of the resultant mixture (resin component) and 0.3 parts by weight of bis(2,6-di-t-butyl-4-methyl phenyl)pentaerythritol diphosphite as phosphorous ester were blended. The resulting blend was melt-kneaded using a 30 mm twin-screw extruder at a resin temperature of 270° C., followed by pelletization. Using an injection molding machine (with a side gate), the thus-obtained pellets were molded into test pieces at a molding temperature of 290° C. The thus-obtained test pieces were tested for mechanical properties, melt viscosity, and the mean aspect ratio of a liquid crystal polyester. Test results are shown in Table 2.

When pellets, before being molded into test pieces, were melted under a non-load state, the liquid crystal polyester was observed to be dispersed such that dispersed particles thereof had a weight average particle diameter of 26 μm, and at least 80 wt. % of dispersed particles thereof had a particle diameter within the range of 12 to 49 μm. Molding conditions were as follows:

① Cross section of runner $S_R$/cross section of gate $S_G$: 9.3

② Gate passage rate: 1200 m/min

③ Injection pressure: 800 kg/cm$^2$

④ Injection speed: 5.8 m/min

EXAMPLE 6

A blend (NOVALLOY S1500 manufactured by Daicel Chemical Industries, Ltd.) of a polycarbonate resin and an ABS resin, and a liquid crystal polyester used in Example 1 were mixed at the ratio by weight of 8:2. 100 parts by weight of the resultant mixture (resin component) and 0.2 parts by weight of bis(2,6-di-t-butyl-4-methyl phenyl)pentaerythritol diphosphite as phosphorous ester were blended. The resulting blend was melt-kneaded using a 30 mm twin-screw extruder at a resin temperature of 270° C., followed by pelletization. The thus-obtained pellets were molded into test pieces in a manner similar to that of Example 5. The thus-obtained test pieces were tested for physical properties, etc. Test results are shown in Table 2.

When pellets, before being molded into test pieces, were melted under a non-load state, the liquid crystal polyester was observed to be dispersed such that dispersed particles thereof had a weight average particle diameter of 27 μm, and at least 80 wt. % of dispersed particles thereof had a particle diameter within the range of 13 to 49 μm.

EXAMPLE 7

A blend (NOVALLOY S1500 manufactured by Daicel Chemical Industries, Ltd.) of a polycarbonate resin and an ABS resin, and a liquid crystal polyester used in Example 1 were mixed at the ratio by weight of 9:1. 100 parts by weight of the resultant mixture (resin component) and 0.1 parts by weight of bis(2,6-di-t-butyl-4-methyl phenyl)pentaerythritol diphosphite as phosphorous ester were blended. The resulting blend was melt-kneaded using a 30 mm twin-screw extruder at a resin temperature of 270° C., followed by pelletization. The thus-obtained pellets were molded into test pieces in a manner similar to that of Example 5. The thus-obtained test pieces were tested for physical properties, etc. Test results are shown in Table 2.

When pellets, before being molded into test pieces, were melted under a non-load state, the liquid crystal polyester was observed to be dispersed such that dispersed particles thereof had a weight average particle diameter of 25 μm, and at least 80 wt. % of dispersed particles thereof had a particle diameter within the range of 10 to 48 μm.

EXAMPLE 8

A polycarbonate resin (IUPILON H3000 manufactured by Mitsubishi Gas Chemical Inc.) and a polybutylene terephthalate resin (DX-2000 manufactured by Polyplastics Co., Ltd.) were blended at the ratio by weight of 7:3. The resulting blend was melt-kneaded using a 30 mm twin-screw extruder at a resin temperature of 270° C., followed by pelletization. The thus-prepared pellets and a liquid crystal polyester used in Example 1 were mixed at the ratio by weight of 8:2. 100 parts by weight of the resultant mixture (resin component) and 0.2 parts by weight of bis(2,6-di-4-methyl phenyl)pentaerythritol diphosphite as phosphorous ester were blended. The resulting blend was melt-kneaded using a 30 mm twin-screw extruder at a resin temperature of 290° C., followed by pelletization. The thus-obtained pellets were molded into test pieces in a manner similar to that of Example 5. The thus-obtained test pieces were tested for physical properties, etc. Test results are shown in Table 2.

When pellets, before being molded into test pieces, were melted under a non-load state, the liquid crystal polyester was observed to be dispersed such that dispersed particles thereof had a weight average particle diameter of 32 μm, and at least 80 wt. % of dispersed particles thereof had a particle diameter within the range of 23 to 50 μm.

EXAMPLE 9

A polycarbonate resin (IUPILON H3000 manufactured by Mitsubishi Gas Chemical Inc.) and a polybutylene terephthalate resin (DX-2000 manufactured by Polyplastics Co., Ltd.) were blended at the ratio by weight of 9:1. The resulting blend was melt-kneaded using a 30 mm twin-screw extruder at a resin temperature of 270° C., followed by pelletization. The thus-prepared pellets and a liquid crystal polyester used in Example 1 were mixed at the ratio by weight of 8:2. 100 parts by weight of the resultant mixture (resin component) and 0.2 parts by weight of bis(2,6-di-4-methyl phenyl)pentaerythritol diphosphite as phosphorous ester were blended. The resulting blend was melt-kneaded using a 30 mm twin-screw extruder at a resin temperature of 290° C., followed by pelletization. The thus-obtained pellets were molded into test pieces in a manner similar to that of Example 5. The thus-obtained test pieces were tested for physical properties, etc. Test results are shown in Table 2.

When pellets, before being molded into test pieces, were melted under a non-load state, the liquid crystal polyester was observed to be dispersed such that dispersed particles thereof had a weight average particle diameter of 29 μm, and at least 80 wt. % of dispersed particles thereof had a particle diameter within the range of 18 to 48 μm.

TABLE 1

|  | Example 1 | Example 2 | Example 3 | Example 4 | Comparative Example 1 | Comparative Exaniple 2 | Comparative Example 3 |
|---|---|---|---|---|---|---|---|
| Flow beginning temperature of liquid crystal polyester (° C.) | 250 | 250 | 250 | 250 | 250 | 250 | 250 |
| Melting point of liquid crystal polyester (° C.) | 280 | 280 | 280 | 280 | 280 | 280 | 280 |
| Melt viscosity (poise) | 1089 | 1089 | 713 | 1460 | 1089 | 4016 | 960 |

TABLE 1-continued

|  | Example 1 | Example 2 | Example 3 | Example 4 | Comparative Example 1 | Comparative Exaniple 2 | Comparative Example 3 |
|---|---|---|---|---|---|---|---|
| (A + B) |  |  |  |  |  |  |  |
| Viscosity ratio (Aμ/Bμ) | 4.75 | 4.75 | 3.56 | 0.18 | 4.75 | 4.75 | 0.09 |
| Flexural modulus (kg/cm$^2$) | 58,000 | 62,000 | 62,000 | 66,000 | 31,000 | 31,000 | 38,000 |
| Mean aspect ratio of liquid crystal polyester | ○ | ○ | ○ | ○ | X | X | X |
| Dispersed particles of liquid crystal polyester after molded test pieces are heat-treated: |  |  |  |  |  | Particles of liquid crystal polyester are not observed |  |
| Weight average particle diameter (μm) | 25 | 25 | 25 | 24 | 25 |  | 40 |
| Particle diameter of at least 80 wt. % of dispersed particles (μm) | 5 to 45 | 5 to 45 | 5 to 45 | 6 to 44 | 5 to 45 |  | 10 to 70 |

TABLE 2

|  | Example 5 | Example 6 | Example 7 | Example 8 | Example 9 |
|---|---|---|---|---|---|
| Flow beginning temperature of liquid crystal polyester (° C.) | 250 | 250 | 250 | 250 | 250 |
| Melting point of liquid crystal polyester (° C.) | 280 | 280 | 280 | 280 | 280 |
| Melt viscosity (poise) | 1219 | 1434 | 1505 | 1080 | 1300 |
| (A + B) |  |  |  |  |  |
| Viscosity ratio (Aμ/Bμ) | 1.95 | 1.95 | 1.95 | 3.75 | 2.75 |
| Flexural modulus (kg/cm$^2$) | 77,000 | 57,000 | 37,000 | 67,000 | 68,000 |
| Mean aspect ratio of liquid crystal polyester | ○ | ○ | ○ | ○ | ○ |
| Dispersed particles of liquid crystal polyester after molded test pieces are heat-treated: |  |  |  |  |  |
| Weight average particle diameter (μm) | 26 | 27 | 25 | 32 | 29 |
| Particle diameter of at least 80 wt. % of dispersed particles (μm) | 12 to 49 | 13 to 49 | 10 to 48 | 23 to 50 | 18 to 48 |

EXAMPLE 10

A polycarbonate resin (IUPILON S3000 manufactured by Mitsubishi Gas Chemical Inc.) and a liquid crystal polyester {p-hydroxybenzoic acid and 6-hydroxy-2-naphthoic acid (molar ratio: 70:30) as component monomers; flow beginning temperature 250° C.; logarithmic viscosity 5.7 (dl/g)} were mixed at the ratio by weight of 6:4. 100 parts by weight of the resultant mixture (resin component) and 0.3 parts by weight of bis(2,6-di-t-butyl-4-methyl phenyl)pentaerythritol diphosphite as phosphorous ester were blended. The resulting blend was melt-kneaded using a 30 mm twin-screw extruder at a resin temperature of 300° C., followed by pelletization. Using an injection molding machine (gate size: 0.5×40 mm; cross section of runner: 60 mm$^2$), the thus-obtained pellets were molded into test pieces, each having a cellular phone shape as shown in FIG. 2, at a molding temperature of 300° C. The thus-obtained test pieces were tested for mechanical properties, melt viscosity, and the mean aspect ratio of a liquid crystal polyester. Test results are shown in Table 3.

① Cross section of runner $S_R$/cross section of gate $S_G$: 3.0

② Gate passage rate: 590 m/min

EXAMPLE 11

A polycarbonate resin (IUPILON S3000 manufactured by Mitsubishi Gas Chemical Inc.) and a liquid crystal polyester used in Example 10 were mixed at the ratio by weight of 8:2. 100 parts by weight of the resultant mixture (resin component) and 0.3 parts by weight of bis(2,6-di-t-butyl-4-methyl phenyl)pentaerythritol diphosphite as phosphorous ester were blended. The resulting blend was melt-kneaded using a 30 mm twin-screw extruder at a resin temperature of 300° C., followed by pelletization. Using an injection molding machine (gate size: 0.5×40 mm; cross section of runner: 60 mm$^2$), the thus-obtained pellets were molded into test pieces, each having a cellular phone shape as shown in FIG. 2, at a molding temperature of 300° C. The thus-obtained test pieces were tested for mechanical properties, melt viscosity, and the mean aspect ratio of a liquid crystal polyester. Test results are shown in Table 3.

① Cross section of runner $S_R$/cross section of gate $S_G$: 3.0

② Gate passage rate: 590 m/min

COMPARATIVE EXAMPLE 4

A polycarbonate resin (IUPILON S3000 manufactured by Mitsubishi Gas Chemical Inc.) and a liquid crystal polyester used in Example 10 were blended at the ratio by weight of 6:4. The resulting blend was melt-kneaded using a 30 mm twin-screw extruder at a resin temperature of 300° C., followed by pelletization. Using an injection molding machine (gate size: 0.5×40 mm; cross section of runner: 60 mm$^2$), the thus-obtained pellets were molded into test pieces, each having a cellular phone shape as shown in FIG. 2, at a molding temperature of 300° C. The thus-obtained test pieces were tested for mechanical properties, melt viscosity, and the mean aspect ratio of a liquid crystal polyester. Test results are shown in Table 3.

① Cross section of runner $S_R$/cross section of gate $S_G$: 3.0

② Gate passage rate: 590 m/min

TABLE 3

|  | Example 10 | Example 11 | Comparative Example 4 |
|---|---|---|---|
| Injection speed (m/min) | 6.0 | 6.0 | 6.0 |
| Injection pressure (kg/cm$^2$) | 900 | 1200 | 1900 |
| Cylinder temperature (° C.) | 300 | 300 | 300 |
| Flextural modulus (kg/cm$^2$) | 78,000 | 53,000 | 35,000 |
| Mean aspect ratio of liquid crystal polyester | ○ | ○ | Fibrous substances are not observed |
| Dispersed particles of liquid crystal polyester after molded test pieces are heat-treated: |  |  | Particles are not observed |
| Weight average particle diameter (μm) | 18 | 35 |  |
| Particle diameter of at least 80 wt. % of dispersed particles (μm) | 1.1 to 28 | 1.3 to 59 |  |
| Melt viscosity (poise) | 800 | 1500 | 2800 |

EXAMPLE 12

A polyacetal resin (M25-44 (MFR=2.5, 190° C.; melting point 165° C.) manufactured by Polyplastics Co., Ltd.) and a liquid crystal polyester {RODRUN LC3000 manufactured by Unitika, Ltd.: p-hydroxybenzoic acid, ethylene glycol, and terephthalic acid (molar ratio: approx. 40:30:30) as component monomers} were blended at the ratio by weight of 7:3. The resulting blend resin was melt-kneaded using a 30 mm twin-screw extruder at a resin temperature of 190° C., followed by pelletization. Using an injection molding machine (with a side gate), the thus-obtained pellets were molded into test pieces at a molding temperature of 190° C. The thus-obtained test pieces were tested for mechanical properties, melt viscosity, and the mean aspect ratio of a liquid crystal polyester. Test results are shown in Table 4.

When pellets, before being molded into test pieces, were melted under a non-load state, the liquid crystal polyester was observed to be dispersed such that dispersed particles thereof had a weight average particle diameter of 25 μm, and at least 80 wt. % of dispersed particles thereof had a particle diameter within the range of 5 to 45 μm. Molding conditions were as follows:

① Cross section of runner $S_R$/cross section of gate $S_G$: 9.3

② Gate passage rate: 1200 m/min

③ Injection pressure: 800 kg/cm$^2$

④ Injection speed: 5.8 m/min

EXAMPLE 13

A polyacetal resin (M90-44 (MFR=9.0, 190° C.; melting point 165° C.) manufactured by Polyplastics Co., Ltd.) and a liquid crystal polyester (RODRUN LC3000 manufactured by Unitika, Ltd.) were blended at the ratio by weight of 7:3. The resulting blend resin was melt-kneaded using a 30 mm twin-screw extruder at a resin temperature of 190° C., followed by pelletization. Using an injection molding machine (with a side gate), the thus-obtained pellets were molded into test pieces at a molding temperature of 190° C. The thus-obtained test pieces were tested for mechanical properties, melt viscosity, and the mean aspect ratio of a liquid crystal polyester. Test results are shown in Table 4.

When pellets, before being molded into test pieces, were melted under a non-load state, the liquid crystal polyester was observed to be dispersed such that dispersed particles thereof had a weight average particle diameter of 30 μm, and at least 80 wt. % of dispersed particles thereof had a particle diameter within the range of 5 to 45 μm. Molding conditions were as follows:

① Cross section of runner $S_R$/cross section of gate $S_G$: 9.3

② Gate passage rate: 1200 m/min

③ Injection pressure: 800 kg/cm$^2$

④ Injection speed: 5.8 m/min

EXAMPLE 14

A polyacetal resin (M90-44 (MFR=9.0, 190° C.; melting point 165° C.) manufactured by Polyplastics Co., Ltd.) and a liquid crystal polyester (RODRUN LC3000 manufactured by Unitika, Ltd.) were blended at the ratio by weight of 7:3. The resulting blend resin was melt-kneaded using a 30 mm twin-screw extruder at a resin temperature of 190° C., followed by pelletization. Using an injection molding machine (with a pin gate), the thus-obtained pellets were molded into test pieces at a molding temperature of 190° C. The thus-obtained test pieces were tested for mechanical properties, melt viscosity, and the mean aspect ratio of a liquid crystal polyester. Test results are shown in Table 4.

When pellets, before being molded into test pieces, were melted under a non-load state, the liquid crystal polyester was observed to be dispersed such that dispersed particles thereof had a weight average particle diameter of 30 μm, and at least 80 wt. % of dispersed particles thereof had a particle diameter within the range of 5 to 45 μm. Molding conditions were as follows:

① Cross section of runner $S_R$/cross section of gate $S_G$: 25

② Gate passage rate: 2850 m/min

③ Injection pressure: 1200 kg/cm$^2$

④ Injection speed: 5.8 m/min

EXAMPLE 15

A polyacetal resin (M270-44 (MFR=27.0, 190° C.; melting point 165° C.) manufactured by Polyplastics Co., Ltd.) and a liquid crystal polyester (RODRUN LC3000 manufactured by Unitika, Ltd.) were blended at the ratio by weight of 7:3. The resulting blend resin was melt-kneaded using a 30 mm twin-screw extruder at a resin temperature of 190° C., followed by pelletization. Using an injection molding machine (with a side gate), the thus-obtained pellets were molded into test pieces at a molding temperature of 190° C. The thus-obtained test pieces were tested for mechanical properties, melt viscosity, and the mean aspect ratio of a liquid crystal polyester. Test results are shown in Table 4.

When pellets, before being molded into test pieces, were melted under a non-load state, the liquid crystal polyester was observed to be dispersed such that dispersed particles thereof had a weight average particle diameter of 30 μm, and at least 80 wt. % of dispersed particles thereof had a particle diameter within the range of 5 to 45 μm. Molding conditions were as follows:

① Cross section of runner $S_R$/cross section of gate $S_G$: 9.3
② Gate passage rate: 1200 m/min
③ Injection pressure: 800 kg/cm$^2$
④ Injection speed: 5.8 m/min

COMPARATIVE EXAMPLE 5

A polyacetal resin (M90-44 (MFR=9.0, 190° C.; melting point 165° C.) manufactured by Polyplastics Co., Ltd.) and a liquid crystal polyester (VECTRA manufactured by Polyplastics Co., Ltd.) were blended at the ratio by weight of 7:3. The resulting blend resin was melt-kneaded using a 30 mm twin-screw extruder at a resin temperature of 190° C., followed by pelletization. Using an injection molding machine (with a side gate), the thus-obtained pellets were molded into test pieces at a molding temperature of 190° C. The thus-obtained test pieces were tested for mechanical properties, melt viscosity, and the mean aspect ratio of a liquid crystal polyester. Test results are shown in Table 4.

When pellets, before being molded into test pieces, were observed without being subjected to heat-treatment, dispersed particles of the liquid crystal polyester were too complex and irregular to evaluate their weight average particle diameter. Molding conditions were as follows:

① Cross section of runner $S_R$/cross section of gate $S_G$: 9.3
② Gate passage rate: 1200 m/min
③ Injection pressure: 800 kg/cm$^2$
④ Injection speed: 5.8 m/min

EXAMPLE 16

A polypropylene resin (HIPOL J600 (MFR=7.0, 230° C.; melting point 160° C.) manufactured by Mitsui Petrochemical Industries, Ltd.) and a liquid crystal polyester (RODRUN LC3000 manufactured by Unitika, Ltd.) were blended at the ratio by weight of 7:3. The resulting blend resin was melt-kneaded using a 30 mm twin-screw extruder at a resin temperature of 230° C., followed by pelletization. Using an injection molding machine (with a side gate), the thus-obtained pellets were molded into test pieces at a molding temperature of 230° C. The thus-obtained test pieces were tested for mechanical properties, melt viscosity, and the mean aspect ratio of a liquid crystal polyester. Test results are shown in Table 4.

When pellets, before being molded into test pieces, were melted under a non-load state, the liquid crystal polyester was observed to be dispersed such that dispersed particles thereof had a weight average particle diameter of 25 μm, and at least 80 wt. % of dispersed particles thereof had a particle diameter within the range of 5 to 45 μm. Molding conditions were as follows:

① Cross section of runner $S_R$/cross section of gate $S_G$: 9.3
② Gate passage rate: 1200 m/min
③ Injection pressure: 800 kg/cm$^2$
④ Injection speed: 5.8 m/min

EXAMPLE 17

A polypropylene resin (HIPOL J900 (MFR=40.0, 230° C.; melting point 160° C.) manufactured by Mitsui Petrochemical Industries, Ltd.) and a liquid crystal polyester (RODRUN LC3000 manufactured by Unitika, Ltd.) were blended at the ratio by weight of 7:3. The resulting blend resin was melt-kneaded using a 30 mm twin-screw extruder at a resin temperature of 230° C., followed by pelletization. Using an injection molding machine (with a side gate), the thus-obtained pellets were molded into test pieces at a molding temperature of 230° C. The thus-obtained test pieces were tested for mechanical properties, melt viscosity, and the mean aspect ratio of a liquid crystal polyester. Test results are shown in Table 4.

When pellets, before being molded into test pieces, were melted under a non-load state, the liquid crystal polyester was observed to be dispersed such that dispersed particles thereof had a weight average particle diameter of 30 μm, and at least 80 wt. % of dispersed particles thereof had a particle diameter within the range of 5 to 45 μm. Molding conditions were as follows:

① Cross section of runner $S_R$/cross section of gate $S_G$: 9.3
② Gate passage rate: 1200 m/min
③ Injection pressure; 800 kg/cm$^2$
④ Injection speed: 5.8 m/min

EXAMPLE 18

A polystyrene resin (TOPOREX 500 (MFR=4.0, 190° C.; Vicat softening point 86° C.) manufactured by Mitsui Toatsu Chemicals, Inc.) and a liquid crystal polyester (RODRUN LC3000 manufactured by Unitika, Ltd.) were blended at the ratio by weight of 7:3. The resulting blend resin was melt-kneaded using a 30 mm twin-screw extruder at a resin temperature of 190° C., followed by pelletization. Using an injection molding machine (with a side gate), the thus-obtained pellets were molded into test pieces at a molding temperature of 190° C. The thus-obtained test pieces were tested for mechanical properties, melt viscosity, and the mean aspect ratio of a liquid crystal polyester. Test results are shown in Table 4.

When pellets, before being molded into test pieces, were melted under a non-load state, the liquid crystal polyester was observed to be dispersed such that dispersed particles thereof had a weight average particle diameter of 25 μm, and at least 80 wt. % of dispersed particles thereof had a particle diameter within the range of 5 to 45 μm. Molding conditions were as follows:

① Cross section of runner $S_R$/cross section of gate $S_G$: 9.3
② Gate passage rate: 1200 m/min
③ Injection pressure: 800 kg/cm$^2$
④ Injection speed: 5.8 m/min

EXAMPLE 19

A polyamide resin (UBE NYLON 6 (1013B) manufactured by Ube Industries, Ltd.; melting point 210° C.) and a liquid crystal polyester (RODRUN LC3000 manufactured by Unitika, Ltd.) were blended at the ratio by weight of 7:3. The resulting blend resin was melt-kneaded using a 30 mm twin-screw extruder at a resin temperature of 230° C., followed by pelletization. Using an injection molding machine (with a side gate), the thus-obtained pellets were molded into test pieces at a molding temperature of 230° C. The thus-obtained test pieces were tested for mechanical properties, melt viscosity, and the mean aspect ratio of a liquid crystal polyester. Test results are shown in Table 4.

When pellets, before being molded into test pieces, were melted under a non-load state, the liquid crystal polyester was observed to be dispersed such that dispersed particles thereof had a weight average particle diameter of 30 μm, and at least 80 wt. % of dispersed particles thereof had a particle diameter within the range of 5 to 45 μm. Molding conditions were as follows:

① Cross section of runner $S_R$/cross section of gate $S_G$: 9.3
② Gate passage rate: 1200 m/min
③ Injection pressure: 800 kg/cm$^2$
④ Injection speed: 5.8 m/min

TABLE 4

|  | Example 12 | Example 13 | Example 14 | Example 15 | Comparative Example 5 | Example 16 | Example 17 | Example 18 | Example 19 |
| --- | --- | --- | --- | --- | --- | --- | --- | --- | --- |
| Thermoplastic resin MFR (g/10 minutes) | 2.5 | 9.0 | 9.0 | 27.0 | 9.0 | 7.0 | 40.0 | 4.0 | — |
| Flow beginning temperature of liquid crystal polyester (° C.) | 182 | 182 | 182 | 182 | 250 | 182 | 182 | 182 | 182 |
| Processing temperature (° C.) | 190 | 190 | 190 | 190 | 190 | 230 | 230 | 190 | 230 |
| Melt viscosity of thermoplastic resin* | 4788 | 3120 | 3120 | 1880 | 3120 | 1110 | 530 | 3900 | 1600 |
| Melt viscosity of liquid crystal polyester* | 4800 | 4800 | 4800 | 4800 | measurement disabled | 270 | 270 | 4800 | 270 |
| Melt viscosity ratio (–) | 1.00 | 0.65 | 0.65 | 0.39 | evaluation disabled | 4.11 | 1.96 | 0.81 | 5.93 |
| Flexural modulus (kg/cm$^2$) | 47,000 | 43,000 | 46,000 | 38,000 | 20,000 | 41,000 | 44,000 | 51,000 | 60,000 |
| Mean aspect ratio of liquid crystal polyester | ○ | ○ | ○ | ○ | X | ○ | ○ | ○ | ○ |
| Dispersed particles of liquid crystal polyester after molded test pieces are heat-treated: |  |  |  |  | particles not observed |  |  |  |  |
| Weight average particle diameter (μm) | 25 | 30 | 30 | 35 |  | 20 | 25 | 30 | 25 |
| Particle diameter of at least 80 wt. % of dispersed particles (μm) | 5 to 45 | 5 to 45 | 5 to 45 | 10 to 50 |  | 5 to 45 | 5 to 45 | 5 to 45 | 5 to 45 |

*: Poise

INDUSTRIAL APPLICABILITY

As described in detail above, when the thermoplastic resin compositions of the present invention are injection-molded under the molding conditions as defined by the present invention, it is possible to obtain thermoplastic resin molded articles containing a liquid crystal polymer in such a dispersed fibrous shape that could not be achieved previously. The molded articles of the invention are characterized by their high rigidity and high strength, and therefore, they are particularly useful for the manufacture of thin wall molded articles, inter alia, housings of electronic devices.

BRIEF DESCRIPTION OF THE DRAWINGS

FIG. 1 provides explanatory sketches of gates and runners.

Figure 2A:
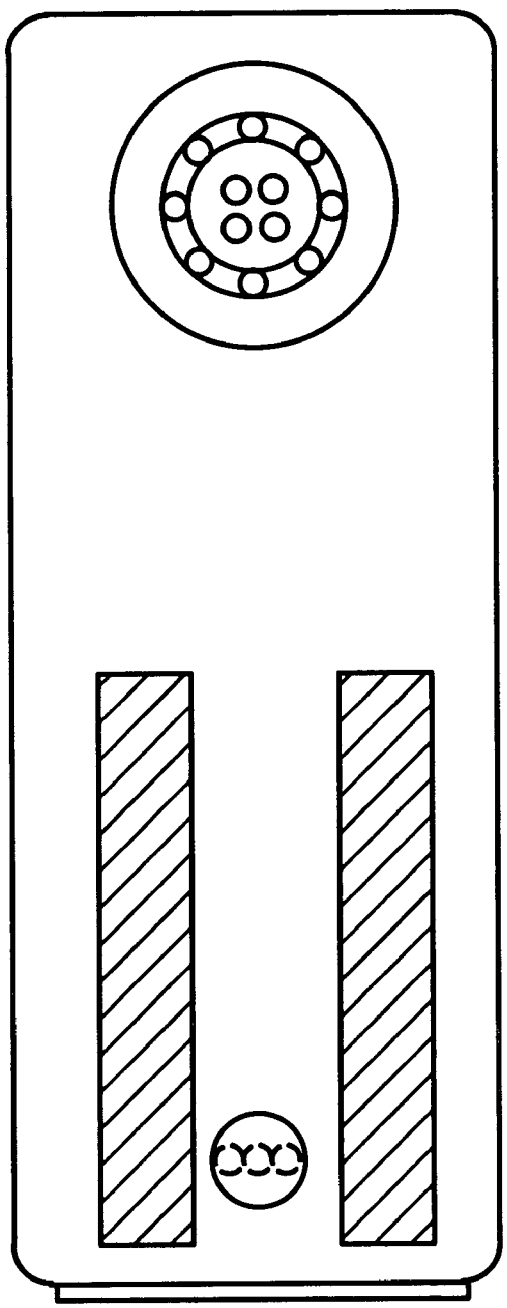
FIG. 2 provides explanatory sketches of a cellular phone-shaped molded article obtained in Examples 10, 11, or Comparative Example 4.
Figure 2B:
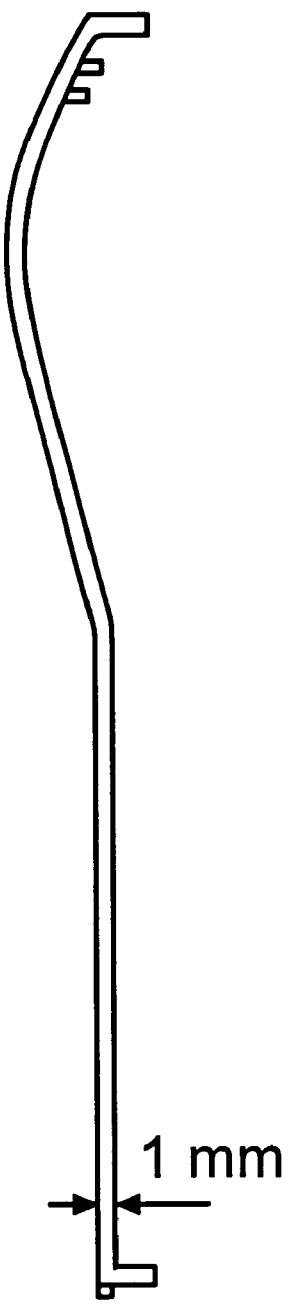

We claim:

1. An injection molding method which comprises the steps of:
   a) blending 99 to 50 wt % of a thermoplastic resin (A) not forming an anisotropic melt phase, 1 to 50 wt % of a liquid crystal polymer (B) capable of forming an anisotropic melt phase (the total of the two accounting for 100 wt %) and 0.01 to 0.5 parts by weight of a phosphorus-containing compound with respect to 100 parts by weight in total of the thermoplastic resin (A) and the liquid crystal polymer (B), and kneading the blend to obtain a thermoplastic resin composition, wherein the thermoplastic resin composition is characterized in that the liquid crystal polymer (B) is microscopically dispersed in the form of islands in the matrix phase of the thermoplastic resin (A) so that when the thermoplastic resin composition is heat-treated at a temperature not lower than the melting point of the liquid crystal polymer (B) under a non-load state and is then cooled, the liquid crystal polymer (B) has a weight average particle diameter within the range of 10 to 40 micrometers and at least 80 wt. % thereof has a particle diameter within the range of 0.5 to 60 micrometers; and
   b) injection molding said thermoplastic resin composition, at a processing temperature greater than or equal to the flow beginning temperature of the liquid crystal polymer (B) and at a gate passage rate of the molten resin of at least 500 m/min to obtain an injection molded article.

2. An injection molding method characterized in that a thermoplastic resin composition comprising 99 to 50 wt. % of a thermoplastic resin (A) not forming an anisotropic melt phase and 1 to 50 wt. % of a liquid crystal polymer (B) capable of forming an anisotropic melt phase (the total of the two accounting for 100 wt. %) and 0.01 to 0.5 parts by weight of a phosphorus-containing compound with respect to 100 parts by weight in total of the thermoplastic resin (A) and the liquid crystal polymer (B) is injection-molded at a processing temperature greater than or equal to the flow beginning temperature of the liquid crystal polymer (B) and at a gate passage rate of the molten resin of at least 500 m/min.

3. An injection molding method as described in claim 1 or 2, characterized in that said injection molding is performed at a processing temperature greater than or equal to the melting point of the liquid crystal polymer (B) and at a gate passage rate of the molten resin of at least 500 m/min.

4. An injection molding method as described in claim 1 or 2, characterized in that said injection molding is performed at a processing temperature greater than or equal to the flow beginning temperature of the liquid crystal polymer (B) and below the melting point thereof and at a gate passage rate of the molten resin of at least 500 m/min.

5. An injection molding method as described in claim 1 or 2, characterized in that said injection molding is performed through use of a mold for injection molding having a ratio $S_R/S_G$ of between 3 and 150, wherein $S_G$ and $S_R$ represent the cross sectional area of a gate of the mold and the cross sectional area of a runner of the mold, respectively.

6. An injection molded article formed of a thermoplastic resin composition comprising 99 to 50 wt. % of a thermoplastic resin (A) not forming an anisotropic melt phase, 1 to 50 wt. % of a liquid crystal polymer (B) capable of forming an anisotropic melt phase (the total of the two accounting for 100 wt. %) and 0.01 to 0.5 parts by weight of a phosphorus-containing compound with respect to 100 parts by weight in total of the thermoplastic resin (A) and the liquid crystal polymer (B), wherein the liquid crystal polymer (B) is dispersed in a fibrous form in the matrix phase of the thermoplastic resin (A) at a mean aspect ratio of at least 6, and the liquid crystal polymer (B) is microscopically dispersed in the form of islands in the matrix phase of the thermoplastic resin (A) so that when the injection-molded article is heat-treated at a temperature not lower than the melting point of the liquid crystal polymer (B) under a non-load state and is then cooled, the liquid crystal polymer (B) has a weight average particle diameter within the range of 10 to 40 micrometers and at least 80 wt. % thereof has a particle diameter within the range of 0.5 to 60 micrometers and said injection molded article is molded at a processing temperature greater than or equal to the flow beginning temperature of the liquid crystal polymer (B).

7. An injection molded article as described in claim 6, wherein the viscosity ratio (Aη/Bη) of thermoplastic resin (A) to liquid crystal polymer (B) is at least 0.1 when measured at a processing temperature greater than or equal to the flow beginning temperature of the liquid crystal polymer (B) and at a shear rate of 1,200 sec$^{-1}$.

8. An injection molded article as described in claim 7, wherein the viscosity ratio (Aη/Bη) is at least 0.1 and not more than 6.

9. An injection molded article as described in claim 6, wherein the thermoplastic resin (A) is polyester resin.

10. An injection molded article as described in claim 9, wherein the polyester resin is polycarbonate resin.

11. An injection molded article as described in claim 6, wherein the thermoplastic resin (A) is a mixture of polycarbonate resin and ABS resin.

12. An injection molded article as described in claim 6, wherein the thermoplastic resin (A) is a mixture of polycarbonate resin, and polyalkylene terephthalate resin and/or amorphous polyarylate resin.

13. An injection molded article as described in claim 6, wherein the thermoplastic resin (A) is polyarylene sulfide resin.

14. An injection molded article formed of a thermoplastic resin composition comprising 99 to 50 wt. % of a thermoplastic resin (A) not forming an anisotropic melt phase, 1 to 50 wt. % of a liquid crystal polymer (B) capable of forming an anisotropic melt phase (the total of the two accounting for 100 wt. %) and 0.01 to 0.5 parts by weight of a phosphorus-containing compound with respect to 100 parts by weight in total of the thermoplastic resin (A) and the liquid crystal polymer (B), wherein the liquid crystal polymer (B) is dispersed in a fibrous form in the matrix phase of the thermoplastic resin (A) at a mean aspect ratio of at least 6; the liquid crystal polymer (B) is microscopically dispersed in the form of islands in the matrix phase of the thermoplastic resin (A) so that when the injection-molded article is heat-treated at a temperature not lower than the melting point of the liquid crystal polymer (B) under a non-load state and is then cooled, the liquid crystal polymer (B) has a weight average particle diameter within the range of 10 to 40 micrometers and at least 80 wt. % thereof has a particle diameter within the range of 0.5 to 60 micrometers;

the flexural modulus of the injection molded article is at least 40,000 kg/cm$^2$ as measured in accordance with ASTM D790; and the melt viscosity of a melt obtained through remelting the injection molded article is within the range from 400 to 2,500 poise when measured at a temperature 20° C. higher than the melting point of the liquid crystal polymer (B) and at a shear rate of 1,200 sec$^{-1}$.

15. An injection molded article as described in claim 14, wherein the thermoplastic resin (A) is polyester resin.

16. An injection molded article as described in claim 15, which is a thin wall article in which 50% or more of the walls of the molded article have a thickness of 1 mm or less.

17. An injection molded article as described in claim 16, which is a housing of an electronic device.

18. An injection molded article as described in claim 14, wherein the thermoplastic resin (A) is polycarbonate resin.

19. An injection molded article as described in claim 14, which is a thin wall article in which 50% or more of the walls of the molded article have a thickness of 1 mm or less.

20. An injection molded article as described in claim 18, which is a housing of an electronic device.

21. An injection molded article as described in claim 20, wherein the electronic device is a personal computer, a cellular phone, a connector, a CD pickup component, a hard disk, or their peripheral components.

22. An injection molding method of a thermoplastic resin composition which comprises the steps of:
    (a) blending 99 to 50 wt. % of a thermoplastic resin (A') having a melting point or a softening point of not higher than 210° C. and being formed of one or more members selected from among polyolefin (co)polymers, styrene (co)polymers, polyamide (co)polymers, polyacrylate, and polyacetal (co)polymers, 1 to 50 wt. % of a liquid crystal polymer (B') having a flow beginning temperature of 80–120° C. and being capable of forming an anisotropic melt phase (the total of the two accounting for 100 wt. % and 0.01 to 0.5 parts by weight of a phosphorus-containing compound with respect to 100 parts by weight in total of the thermoplastic resin (A') and the liquid crystal polymer (B'), and kneading the blend to obtain a thermoplastic resin composition; and
    (b) injection-molding said thermoplastic resin composition at a processing temperature greater than or equal to the flow beginning temperature of the liquid crystal polymer (B') and at a gate passage rate of the molten resin of at least 500 m/min.

23. An injection molding method of a thermoplastic resin composition as described in claim 22, wherein the viscosity ratio (A'η/B'η) of thermoplastic resin (A') to liquid crystal polymer (B') is at least 0.1 when measured at a processing temperature greater than or equal to the flow beginning temperature of the liquid crystal polymer (B') and at a shear rate of 1,200 sec$^{-1}$.

24. An injection molding method of a thermoplastic resin composition as described in claim 22, wherein the liquid crystal polymer (B') is formed of a structural unit of aromatic hydroxycarboxylic acid/aliphatic diol/aromatic dicarboxylic acid.

25. An injection molding method of a thermoplastic resin composition as described in claim 22, wherein the liquid crystal polymer (B') is formed of a structural unit of aromatic hydroxycarboxylic acid/ethylene glycol/terephthalic acid, and the aromatic hydroxycarboxylic acid content is between 30 and 70 mole % based on the entirety of the structural monomers.

26. An injection molding method of a thermoplastic resin composition as described in claim 25, wherein the aromatic hydroxycarboxylic acid is p-hydroxybenzoic acid.

27. An injection molding method of a thermoplastic resin composition as described in claim 25, wherein the aromatic hydroxycarboxylic acid comprises p-hydroxybenzoic acid and 6-hydroxy-2-naphthoic acid.

28. An injection molding method of a thermoplastic resin composition as described in claim 22, characterized in that a mold for injection molding having a ratio $S_R/S_G$ of between 3 and 150, wherein $S_G$ and $S_R$ represent the cross sectional area of a gate of the mold and the cross sectional area of a runner of the mold, respectively, is used.

29. An injection molded article formed of a thermoplastic resin composition comprising 99 to 50 wt. % of a thermoplastic resin (A') having a melting point or a softening point of not higher than 210° C. and being formed of one or more members selected from polyolefin (co)polymers, styrene (co)polymers, polyamide (co)polymers, polyacrylate, and polyacetal (co)polymers, 1 to 50 wt. % of a liquid crystal polymer (B') having a flow beginning temperature of 80–210° C. and being capable of forming an anisotropic melt phase (the total of the two accounting for 100 wt. %) and 0.01 to 0.5 parts by weight of a phosphorus-containing compound with respect to 100 parts by weight in total of the thermoplastic resin (A') and the liquid crystal polymer (B'), wherein the liquid crystal polymer (B') is dispersed in a fibrous form in the matrix phase of the thermoplastic resin (A') at a mean aspect ratio of at least 6, and that the liquid crystal polymer (B') is microscopically dispersed in the form of islands in the matrix phase of the thermoplastic resin (A') so that when the injection-molded article is heat-treated at a temperature not lower than the melting point of the liquid crystal polymer (B') under a non-load state and is then cooled, the liquid crystal polymer (B') has a weight average particle diameter within the range of 10 to 40 micrometers and at least 80 wt. % thereof has a particle diameter within the range of 0.5 to 60 micrometers.

\* \* \* \* \*